(12) United States Patent
Soliman et al.

(10) Patent No.: US 8,966,292 B2
(45) Date of Patent: Feb. 24, 2015

(54) PERFORMANCE IMPROVEMENTS IN A WIRELESS CLIENT TERMINAL USING ASSISTANCE FROM A PROXY DEVICE

(75) Inventors: Samir S. Soliman, San Diego, CA (US); Olufunmilola O. Awoniyi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 910 days.

(21) Appl. No.: 12/983,557

(22) Filed: Jan. 3, 2011

(65) Prior Publication Data

US 2012/0173901 A1 Jul. 5, 2012

(51) Int. Cl.
| | |
|---|---|
| G06F 1/32 | (2006.01) |
| H04W 88/18 | (2009.01) |
| H04W 52/02 | (2009.01) |
| H04W 88/06 | (2009.01) |
| H04W 88/04 | (2009.01) |
| H04W 76/02 | (2009.01) |

(52) U.S. Cl.
CPC ............ *H04W 88/182* (2013.01); *H04W 88/06* (2013.01); *H04W 88/04* (2013.01); *H04W 76/025* (2013.01); *Y02B 60/50* (2013.01); *H04W 52/0229* (2013.01)
USPC ........... 713/300; 713/310; 713/320; 713/321; 713/322; 713/323; 713/324; 370/328

(58) Field of Classification Search
USPC ........... 713/300, 320–324, 330, 340; 370/328
See application file for complete search history.

(56) References Cited

U.S. PATENT DOCUMENTS

| | | | |
|---|---|---|---|
| 7,249,292 B2 * | 7/2007 | Kim .............................. | 714/707 |
| 7,260,729 B2 * | 8/2007 | Araki ............................ | 713/300 |
| 7,705,668 B2 * | 4/2010 | Hoshi et al. ................... | 327/594 |
| 8,442,475 B2 * | 5/2013 | Antonio et al. ............ | 455/343.1 |
| 8,463,333 B2 * | 6/2013 | Stuivenwold ................. | 455/574 |
| 2005/0120282 A1 * | 6/2005 | Kim .............................. | 714/707 |
| 2007/0150702 A1 * | 6/2007 | Verheyen et al. ............... | 712/34 |
| 2007/0218893 A1 | 9/2007 | Tatman et al. | |
| 2008/0192666 A1 | 8/2008 | Koskan et al. | |
| 2009/0221261 A1 | 9/2009 | Soliman | |
| 2009/0287947 A1 * | 11/2009 | Dubose ......................... | 713/323 |
| 2010/0067433 A1 | 3/2010 | Cheng et al. | |
| 2010/0182915 A1 | 7/2010 | Montemurro et al. | |
| 2012/0122511 A1 * | 5/2012 | Antonio et al. ............... | 455/522 |

FOREIGN PATENT DOCUMENTS

| | | |
|---|---|---|
| WO | 2009111178 A1 | 9/2009 |
| WO | 2010033413 | 3/2010 |

OTHER PUBLICATIONS

International Search Report and Written Opinion—PCT/US2011/065261—ISA/EPO—Mar. 28, 2012.

* cited by examiner

*Primary Examiner* — M Elamin
(74) *Attorney, Agent, or Firm* — Jeffrey Jacobs

(57) ABSTRACT

Various features are provided to improve communication performance and power conservation in a client terminal by relying on the assistance of a proxy device. For instance, rather than reporting channel measurements via a primary communication channel to a network, the client terminal may be adapted to perform (a) channel measurement feedback using out-of-band signaling via the proxy device and/or (b) active synchronization with assistance of a proxy device. In this manner, the client terminal may be able to disable or reduce power consumption over a primary communication interface for the primary communication channel while utilizing a secondary communication interface to communicate with the proxy device.

48 Claims, 15 Drawing Sheets

PERFORMANCE IMPROVEMENTS IN A WIRELESS CLIENT TERMINAL USING ASSISTANCE FROM A PROXY DEVICE

BACKGROUND

1. Field

Various features pertain to wireless communication systems, and at least some features pertain to devices and methods for improving transmission performance in a wireless network using a plurality of network interfaces for communicating data between a client terminal and proxy device.

2. Background

Client terminals, such as laptop computers, personal digital assistant devices, mobile or cellular phones, or any other device with a processor, that communicate with other devices through wireless signals are becoming increasingly popular. Client terminals typically utilize various channels for different modes of operation. With consumers using powerful applications that run on the client terminals and often require nearly continuous network access, conserving network resources such as bandwidth becomes increasingly important. At the same time, client terminals often have a limited power source (e.g., rechargeable battery pack) and, consequently, may operate in various modes that may assist in extending the operating life of a client terminal between recharging.

A conventional client terminal may operate in one of several modes depending on the communication standard being implemented in a wireless network. For example, Wideband Code Division Multiple Access (WCDMA), the client terminal can be in a Radio Resource Control (RRC) idle mode or connected mode. In the idle mode, no radio resources are available for use in communications. Instead, client terminal periodically monitors one or more control channels, such as the paging channel (PCH), in case the wireless network sends a paging message and/or a control/overhead message. Paging messages may instruct the client terminal to request radio resources to receive an incoming data message. Control/overhead messages carry system information and other information for the client terminal.

If the client terminal desires to make a call or receives a page notification for an incoming call, it requests radio resources to operate in RRC connected mode from the wireless network before proceeding to make or accept the call. In the RRC connected mode, the client terminal can operate in several states which vary in terms of the amount of data communicated, power consumption and available resources. The several states of the RRC connected mode may include, for example, UTRAN Registration Area Paging Channel (URA_PCH), Cell Paging Channel (CELL_PCH), Cell Dedicated Channel (CELL_DCH) and Cell Forward Access Channel (CELL_FACH).

The URA_PCH and CELL_PCH states are similar to the idle mode. For example, the client terminal operating in the CELL_PCH and/or the URA_PCH monitors paging channels periodically and cannot transmit any control or data packets to the wireless network. However, unlike the idle mode, the client terminal has radio resources which are assigned but preserved. The client terminal's power consumption in these states is quite minimal, similar to the idle mode power consumption.

The CELL_DCH and CELL_FACH are two states where the client terminal actively transmits data to and receives data from the wireless network. In the CELL_DCH state, dedicated resources are assigned to the client terminal. In the CELL_FACH state, the client terminal uses common resources (e.g., channels) shared by other terminals in a common cell. Unlike the idle mode, URA_PCH and CELL_PCH states, where the client terminal only periodically monitors paging and/or control/overhead channels, the client terminal operating in the CELL_DCH or CELL_FACH state is continuously monitoring data and control channels for a significant portion of its connection period. Therefore, these two states are responsible for most of the power consumption in the client terminal. The CELL_FACH state operates as a transition state between the idle mode and the CELL_DCH state and typically consumes less power than the CELL_DCH state.

Many of the "always on" applications that run on modern client terminals utilize internet or other network connectivity on a substantially continuous basis, which may inhibit the client terminal from operating in idle mode. For example, instant messaging applications, voice over IP (VOIP) applications, push email, and other connected program applications are typically active, even when such applications are running in the background. With one or more such applications running, the client device may transmit and/or receive several IP packets per time period (e.g., minute) to keep the connection to the servers on the internet active. Such low-rate data communications may require a connected mode in which the client terminal may actively transmit and receive data from the wireless network. Typically, such low-rate data communications are carried out in a transition state of the connected mode (e.g., CELL_FACH state) utilizing shared channels for transmitting data to the wireless network from the client terminal, which shared channels can be relatively slow and are conventionally not well-suited to managing a large number of client terminals.

Therefore, there is a need for a solution that enables resource-efficient communications between a client terminal and a wireless network when the client terminal is operating in a transition state.

SUMMARY

One feature provides a method for facilitating improved data communications between a client terminal and a wireless network while providing power conservation to the client terminal. Such a client terminal may include a first communication circuit for wirelessly communicating over a first communication channel. A second communication circuit is also included for wirelessly communicating over a second communication channel. A processing circuit may be coupled to the first communication circuit and to the second communication circuit. The processing circuit may be adapted to establish communications with a proxy device over both the first communication channel and the second communication channel. The first communication circuit may then operate in a power conserving mode where feedback data associated with the first communication channel bypasses the first communication circuit and is conveyed via the second communication channel. For example, in the power conserving mode the processing circuit may maintain at least part of a protocol stack for the first communication circuit according to a quasi-connected mode while the lower layers of the protocol stack (e.g. the physical and medium access control layers) of the first communication circuit operate according to a lowered power mode.

The processing circuit may be further adapted to establish a communication session with a networked device via the first communication circuit. The communication session may include periodic heartbeat signals to be sent by the client terminal for keeping the communication session alive. The processing circuit may send a proxy request that is adapted to request a proxy device to send the periodic heartbeat signals on behalf of the client terminal and monitor the communication session for a data indicator. The processing circuit may then switch to an idle mode where the first communication circuit is idled or disabled while the second communication channel is monitored for any forwarded data indicator.

A method operational in a client terminal is also provided for facilitating improved data communications between a client terminal and a wireless network while providing power conservation to the client terminal. Such a method may include establishing wireless communications with a proxy device through a first communication circuit via a first communication channel and through a second communication circuit via a second communication channel. The first communication circuit may be operated in a power conserving mode where feedback data associated with the first communication channel bypasses the first communication circuit and is conveyed via the second communication channel. For example, in the power conserving mode the client terminal may maintain at least part of a protocol stack (e.g., higher layers of the protocol stack) for the first communication circuit according to a quasi-connected mode while lower layers of the protocol stack of the first communication circuit operate according to a lowered power mode.

In addition, a communication session may be established with a networked device via the first communication circuit. Such a communication session may include periodic heartbeat signals to be sent by the client terminal for keeping the communication session alive. A proxy request may be sent by the client terminal for requesting a proxy device to send the periodic heartbeat signals on behalf of the client terminal and to monitor the communication session for a data indicator. The client terminal may then switch to a lowered power mode where the first communication circuit is idled or disabled while the second communication channel is monitored for a forwarded data indicator.

Another feature provides proxy devices for facilitating improved data communications between a client terminal and a wireless network while the client terminal is operating in a lowered power mode. Such a proxy device may include a first communication circuit for wirelessly communicating over a first communication channel and a second communication circuit for wirelessly communicating over a second communication channel. A processing circuit may be coupled to the first communication circuit and to the second communication circuit. The processing circuit may be adapted to receive feedback data from a client terminal over the second communication channel. Such feedback data may be associated with one or more characteristics of a first communication channel for the client terminal. The processing circuit may communicate the received feedback data to a network entity on behalf of the client terminal.

The processing circuit of the proxy device may be further adapted to receive a request via the second communication channel to act as a proxy for the client terminal during a communication session between the client terminal and a networked device. The processing circuit may then transmit one or more periodic heartbeat signals to the networked device on behalf of the client terminal to keep the communication session alive via a network communication channel with the network entity.

A method operational in a proxy device is also provided for facilitating improved data communications between a client terminal and a wireless network while the client terminal is operating in a lowered power mode. Such a method may include receiving feedback data from a client terminal over a second communication channel using a second communication circuit. The feedback data may be associated with one or more characteristics of a first communication channel for the client terminal. The received feedback data may be communicated by the proxy device to a network entity on behalf of the client terminal (e.g., via a network communication channel).

Such a method may further include receiving a request to act as a proxy for the client terminal during a communication session between the client terminal and a networked device. The proxy device may then transmit a periodic heartbeat signal to the networked device on behalf of the client terminal to keep the communication session alive.

DETAILED DESCRIPTION

Figure 1:
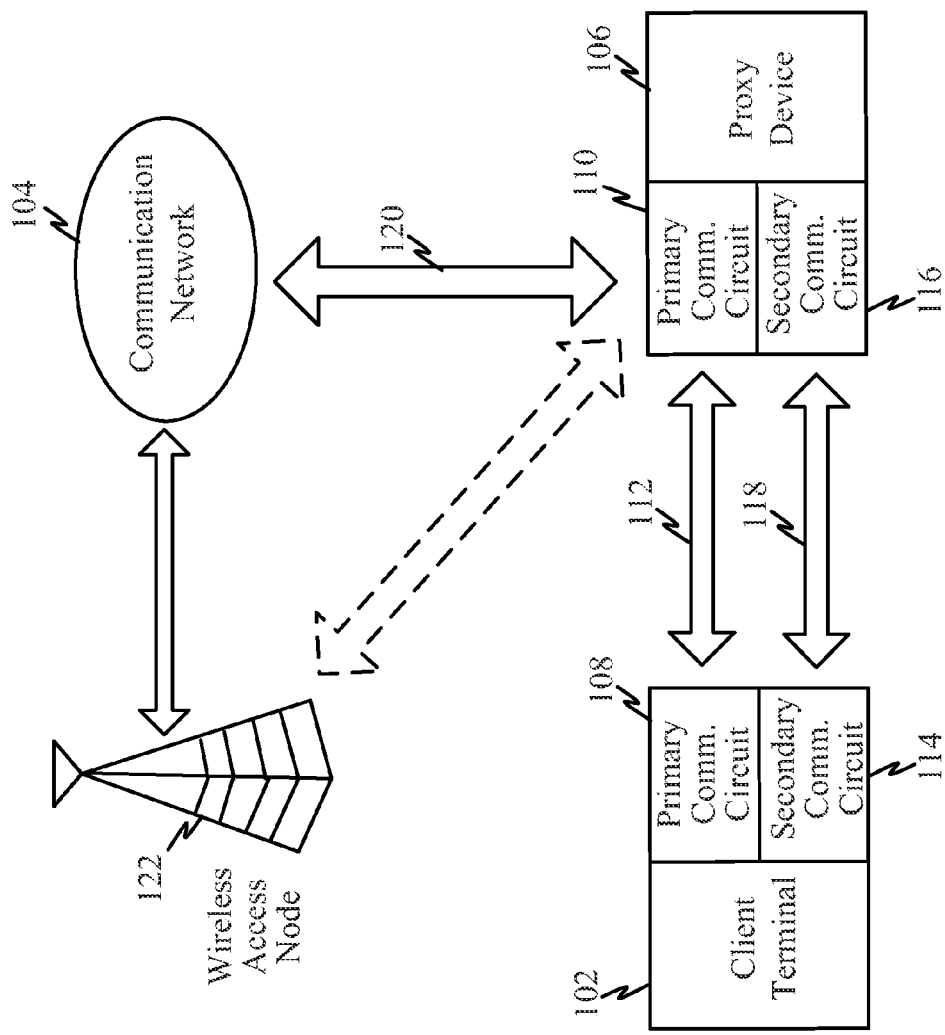
FIG. 1 is a block diagram illustrating a wireless communication system in which a proxy device may facilitate data communication for a client terminal operating in a transition state of a connected mode.

In the following description, specific details are given to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, structures and techniques may be shown in detail in order not to obscure the embodiments.

In the following description, certain terminology is used to describe certain features of one or more embodiments. For instance, the term "client terminal" refers to mobile phones, pagers, wireless modems, personal digital assistants, personal information managers (PIMs), palmtop computers, laptop computers, and/or other mobile communication/computing devices which communicate, at least partially, through a wireless or cellular network. The term "proxy device" may include any device that facilitates wireless connectivity (for wireless or wired communication devices) to a voice or data network and that has wireless communication capabilities to communicate with a client terminal over both a primary communication circuit and a secondary communication circuit. By way of example and not limitation, some embodiments of a proxy device may comprise an access node, such as a base station, Node-B device, femto cell, pico cell, macro cell, etc. Furthermore, the word "exemplary" is used herein to mean "serving as an example, instance, or illustration." Any implementation or embodiment described herein as "exemplary" is not necessarily to be construed as preferred or advantageous over other implementations or embodiments.

Overview

Various features pertain to achieving power conservation and/or improved performance in a client terminal by using a local proxy device. The client terminal may include a primary communication circuit/interface and a secondary communication circuit/interface. Generally, the primary communication circuit/interface may have a higher power consumption (and possibly longer range, bandwidth, and/or data rate) than the secondary communication circuit/interface. Thus, whenever possible, it may be preferable to utilize the secondary communication circuit/interface while placing the primary communication circuit/interface in a lowered power mode.

According to a first feature, a client terminal may be adapted to perform channel measurement feedback using out-of-band signaling. That is, the client terminal may monitor or listen on a network communication channel (e.g., frequency band or spectrum, etc.) using its primary communication circuit/interface to determine network channel conditions (as perceived by the client terminal). Rather than reporting such network channel conditions (e.g., feedback data) to the network using the primary communication circuit/interface, the client terminal may instead send the network channel conditions to a proxy device via the secondary communication circuit/interface. The proxy device then forwards the network channel conditions to the network on behalf of the client terminal.

According to a second feature, the client terminal may perform active synchronization with assistance of a proxy device. In active synchronization, an application in the client terminal may establish a communication session with a network entity over its primary communication circuit/interface. To keep the communication session alive, network entity may expect that the client terminal send a periodic heartbeat (e.g., keep alive) signal over the primary communication circuit/interface. However, this is wasteful of limited power resources available to the client terminal. Instead, the client terminal sends a proxy request to the proxy device to send the periodic heartbeat signal to the network on behalf of the client terminal. The proxy device undertakes to send the periodic heartbeat signals on behalf of the client terminal to keep the communication session alive and also monitors for any incoming data indicators for the client terminal (e.g., associated with the communication session). In the meantime, the client terminal may lower the operating state (e.g., idle) of the primary communication circuit/interface to conserve power. If a data indicator is received, the proxy device forwards it to the client terminal over the secondary communication circuit/interface. As a result of receiving such data indicator, the client terminal may reactivate its primary communication circuit/interface and resume reception from the communication session.

Exemplary Network Environment

FIG. 1 is a block diagram illustrating a wireless communication system in which a proxy device may facilitate data communication for a client terminal operating in a transition state of a connected mode. A client terminal 102 may be capable of communicating through a communication network 104 via a proxy device 106 that may be part of the communication network 104. In one example, the proxy device 106 may operate as a femto cell to provide network connectivity to local client terminals.

The client terminal 102 and proxy device 106 include primary communication circuits 108 and 110 (or transceivers) for communicating directly with each other through a first wireless link 112. For example, the primary communication circuits 108 and 110 may each include a first wireless communication interface and/or a transmitter/receiver chain that facilitates sending and/or receiving over-the-air transmissions. Furthermore, the client terminal 102 and proxy device 106 also include secondary communication circuits 114 and 116 (or transceivers) for communicating directly with each other via a second wireless link 118. The secondary communication circuits 114 and 116 may each include a second wireless communication interface and/or a transmitter/receiver chain that facilitates sending and/or receiving over-the-air transmissions. Note that the first wireless link 112 may operate on a first frequency band or channel while the second wireless link 118 may operate on a second frequency band or channel different or distinct from the first frequency band or channel. In one implementation, the secondary communication circuits 114 and 116 may consume less power than the primary communication circuits 108 and 110 for a given time of operation in equivalent operating modes (e.g., connected modes). The client terminal 102 may be powered by an internal (limited) power source (e.g., battery).

The client terminal 102 may operate in various modes, including a connected mode and a lowered power mode (e.g., idle/sleep mode). The connected mode may include a fully connected state in which the client terminal 102 is assigned one or more dedicated channels for transmitting communications to and/or receiving communications from the communication network 104. The connected mode may further include a transition state between the lowered power mode and the fully connected state. A transition state may use one or more shared channels for transmitting communications to and/or receiving communications from the communication network 104. Such a transition state may be referred to herein as a quasi-connected mode.

While in the connected mode, the client terminal 102 may use its primary communication circuit 108 to communicate with the proxy device 106 to establish a call/session for receiving and/or transmitting data and/or control messages. In a quasi-connected mode, the client terminal 102 may continuously or frequently monitor its data or control channel and may use its secondary communication circuit 114 to communicate with the proxy device 106 to establish or maintain a session for receiving and/or transmitting data or control messages. In the lowered power mode, the client terminal 102 may monitor a paging channel for paging messages sent by the proxy device 106. In some embodiments, the client terminal 102 may turn off its primary communication circuit 108 in quasi-connected mode and may monitor the paging channel for paging messages sent by the proxy device 106 using the secondary communication circuit 114.

The operating mode of the client terminal 102 (or of its primary communication circuit 108) may be communicated to and/or set by the wireless access node 122 or other entity of the wireless communication network 104. For example, the access node 122 may know the quasi-connected mode (e.g., Cell_FACH) of the client terminal 102. Thus, the wireless communication network 104 and/or access node 122 expects the client terminal 102 to respond according to its expected operating mode (e.g., reply to data/control messages within a given time period, etc.).

According to one feature, when the client terminal 102 changes its operating mode (or at least the operating mode of the primary communication circuit 108) from the connected mode or the quasi-connected mode to a lowered power mode (e.g., similar to the idle mode), the primary communication circuit 108 may be bypassed for communicating low-rate data or control messages. Instead, such low-rate data and/or control messages may be communicated using the secondary communication circuit 114. Prior to changing from the connected mode or the quasi-connected mode to the lowered power mode (e.g., idle mode), the client terminal 102 may setup a communication link (e.g., second wireless link 118) to/from the proxy device 106 through the secondary communication circuit 114. That is, the client terminal 102 may find the local proxy device 106 by scanning on its primary communication circuit 108 (e.g., monitoring for messages from the proxy device 106 over a common wireless channel) and/or its secondary communication circuit 114 (e.g., monitoring for signals indicating the presence of the proxy devices 106). In some embodiments, the secondary communication circuit 114 may be used to scan for a proxy device 106 since it is the circuit that will be employed to communicate low-rate data or control messages between the client terminal 102 and the proxy device 106 (e.g., when the primary communication circuit 108 is bypassed). In performing such a scan, the client terminal 102 may attempt to identify potential proxy devices 106 that have both a primary communication circuit and a secondary communication circuit. For example, the proxy device 106 may operate as a femto cell to provide network connectivity to client terminals. Thus, the client terminal 102 is able to communicate data and/or control messages to/from the proxy device 106 via primary communication circuits 108, 110 when operating in a connected or quasi-connected mode, and via the secondary communication circuits 114, 116 when the primary communication circuit 108 is operating in the lowered power mode (e.g., idle mode).

When a proxy device 106 is identified by the client terminal 102, a communication link may be established or setup via the secondary communication circuits 114 and 116 of the client terminal 102 and proxy device 106, respectively. For example, if the secondary communication circuit 114 is a Bluetooth compliant circuit, the proxy device 106 may be configured to operate according to a pseudo-random sequence called a hop sequence or frequency hop sequence so that the proxy device 106 and the client terminal 102 can communicate with each other via their respective secondary communication circuits 116 and 114. Once the communication link (e.g., second wireless link 118) has been established between the client terminal 102 and the proxy device 106, and the proxy device 106 has accepted a request to proxy for the client terminal 102, the client terminal 102 may then change its operating mode to a lowered power mode (e.g., idle mode) for the primary communication circuit 108. In one example, the transition from the connected mode to quasi-connected mode may be instructed or directed by the communication network 104 (or access node 122) based on low data activity with the communication network 104. However, the transition from the quasi-connected mode to the lowered power mode (e.g., idle mode) may be independently directed by the client terminal 102. Thus, the communication network 104 and/or access node 122 may still believe that the client terminal 102 is in the connected or quasi-connected mode. In changing its primary communication circuit 108 from connected mode or quasi-connected mode to the lowered power mode (e.g., idle mode), the client terminal 102 may at least partially bypass its primary communication circuit 108 and may activate its secondary communication circuit 114 to send and/or receive at least some data and/or control messages via the proxy device 106.

As the primary communication circuit 108 is relatively slower than the secondary communication circuit 114, at least partially bypassing the primary communication circuit 108 and using the secondary communication circuit 114 for at least some data and/or control messages facilitates faster and/or more frequent transmission and/or reception of such data and/or control messages at the client terminal 102. Furthermore, as the primary communication circuit 108 consumes more power than the secondary communication circuit 108, bypassing the primary communication circuit 108 and using the secondary communication circuit 114 for transmitting and/or receiving at least some data and/or control messages also facilitates power conservation at the client terminal 102.

By way of example and not limitation, the primary communication circuits 108, 110 may be a long range, high power, and/or high bandwidth communication circuit such as a W-CDMA compliant transceiver. However, in other embodiments, such high power circuit may operate according contemporary communication standards, including but not limited to W-CDMA, cdma2000, GSM, WiMax, and WLAN.

Also by way of example and not limitation, the secondary communication circuits 114, 116 may be a short range, low power, and/or low bandwidth communication circuit. For example, the secondary communication circuits 114, 116 according to at least one embodiment may each comprise a Bluetooth compliant transceiver that uses a time-division duplex (TDD) scheme. Such Bluetooth circuit may alternately transmit and receive in a synchronous manner. This allows a plurality of terminals connected via Bluetooth technology to communicate in an ad hoc fashion often called piconet.

According to another feature, at least some embodiments of the client terminal 102 may be configured to unilaterally change its operating mode (or at least the operating mode of the primary communication circuit 108) from a connected mode (or quasi-connected mode) to a lowered power mode (e.g., idle or sleep mode). Due to this change in operating mode, the primary communication circuit 108 is completely or periodically turned Off, thereby conserving power. The client terminal 102 may send a proxy request to a selected proxy device 106 to monitor network connections (e.g., an internet connection) and/or network characteristics (e.g., channel measurements). In other embodiments, the proxy device 106 may direct the client terminal 102 to switch to the lowered power mode, while the proxy device 106 monitors network connections and/or network characteristics on behalf of the client terminal 102. For example, the proxy device 106 may be configured to identify an operating mode or type of network activity of the client terminal 102 and send a request to the client terminal 102 to switch its operating mode, allowing the proxy device to perform certain functions on behalf of the client terminal 102. Once the proxy device 104 has been established as a proxy for the client terminal 102, the client terminal 102 may change its operating mode to, or remain in, the lowered power mode (e.g., idle/sleep mode) and may power down (or turn Off) all or part of its primary communication circuit 108 and activate its secondary communication circuit 114 to communicate data and/or control messages to/from the proxy device 106.

According to various features, the selected proxy device 106 may provide access to the communication network 104 for the client terminal 102 over its primary communication circuit 108 as well as over its secondary communication circuit 114. The proxy device 106 may be directly coupled to the communication network 104 via a communication link 120. According to various embodiments, the communication link 120 may comprise a wired or wireless link to the communication network 104. The proxy device 106 may also monitor one or more network connections or channels allocated to the client terminal 102 and forward any data or control messages intended for the client terminal 102 via the secondary communication circuit 116 to the client terminal 102. Furthermore, the proxy device 106 may be adapted to monitor network characteristics for the client terminal 102. For example, the proxy device 106 may monitor one or more other wireless access nodes 122 of the network to obtain network data and measurements, which may be used by the client terminal 102 or reported to the communication network 104.

The operations and/or functionality of the proxy device 106 may be implemented as an access node. As used herein, an access node may be a device that can wirelessly communicate with one or more terminals and may also be referred to as, and include some or all the functionality of: a base station, Node-B device, femto cell, pico cell, macro cell, or some other similar devices. A terminal (e.g., client terminal 102) may also be referred to as, and include some or all the functionality of, a user equipment (UE), a wireless communication device, a mobile station, computer, laptop, mobile phone, a mobile device, cellular phone, or some other terminology.

The communication techniques described herein may be implemented on various types of wireless communication systems such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Worldwide Interoperability for Microwave Access (Wi-Max). A CDMA system may implement a radio access technology (RAT) such as Wideband CDMA (W-CDMA), CDMA2000, and so on. RAT refers to the technology used for over-the-air communication. A TDMA system may implement a RAT such as Global System for Mobile Communications (GSM). Universal Mobile Telecommunication System (UMTS) is a system that uses W-CDMA and GSM as RATs and is described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available.

Exemplary Operating Modes for Client Terminal

Figure 2:
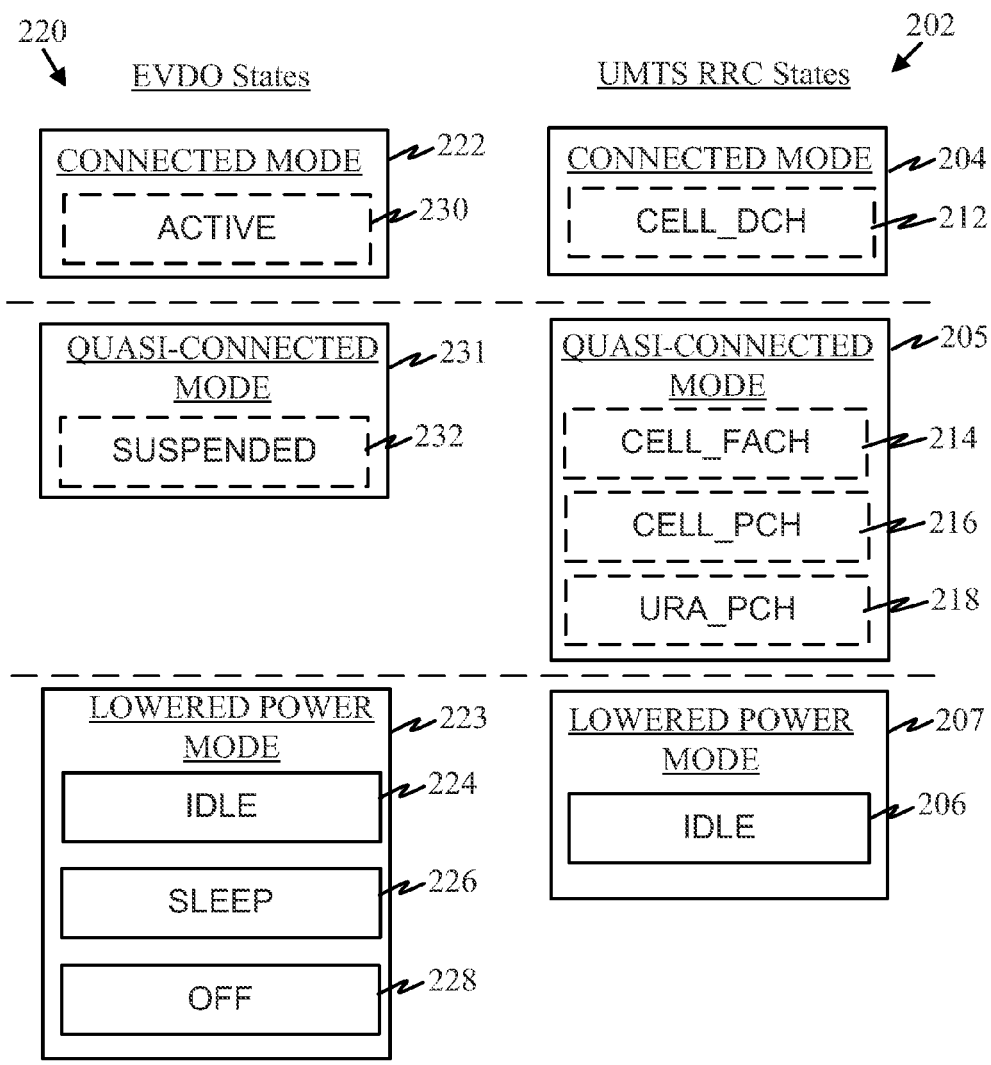
FIG. 2 illustrates operating modes for two different wireless communication standards.

As described herein, various features may be achieved as the client terminal switches between various operating modes. In general, these operating modes may be described as connected mode, quasi-connected mode, and lowered power mode. FIG. 2 illustrates operating modes for two different wireless communication standards. For example, the Universal Mobile Telecommunications System (UMTS) Wideband Code Division Multiple Access (W-CDMA) is an air interface standard that specifies a Radio Resource Control (RRC) defining various modes of operation. The UMTS RRC States 202 define a connected mode 204, a quasi-connected mode 205, and/or a lowered power mode 207. In one example, the connected mode 204 may include various states, such as Cell_DCH 212, the quasi-connected mode may include Cell_FACH 214, Cell_PCH 216, and URA_PCH 218, and the lowered power mode may include the Idle mode 206.

The lowered power mode 207 may have the lowest power consumption since there is no connection to the wireless network (e.g., primary communication circuit is completely or periodically turned Off), while quasi-connected mode may have somewhat reduced power consumption relative to the connected mode. In one example, the quasi-connected mode Cell_FACH 214 consumes roughly fifty percent the power of the connected mode Cell_DCH 212.

Similarly, Evolution-Data Only (EVDO) is part of the CDMA2000 family of standards and defines a plurality of EVDO operating states 220, including a connected mode 222 such as an active mode 230, a quasi-connected mode 231 such as suspended mode 232, and a lowered power mode 223 such as an idle mode 224, a sleep mode 226, and/or an off mode 228.

Uplink Out-Of-Band Transmission Bypass

Figure 3:
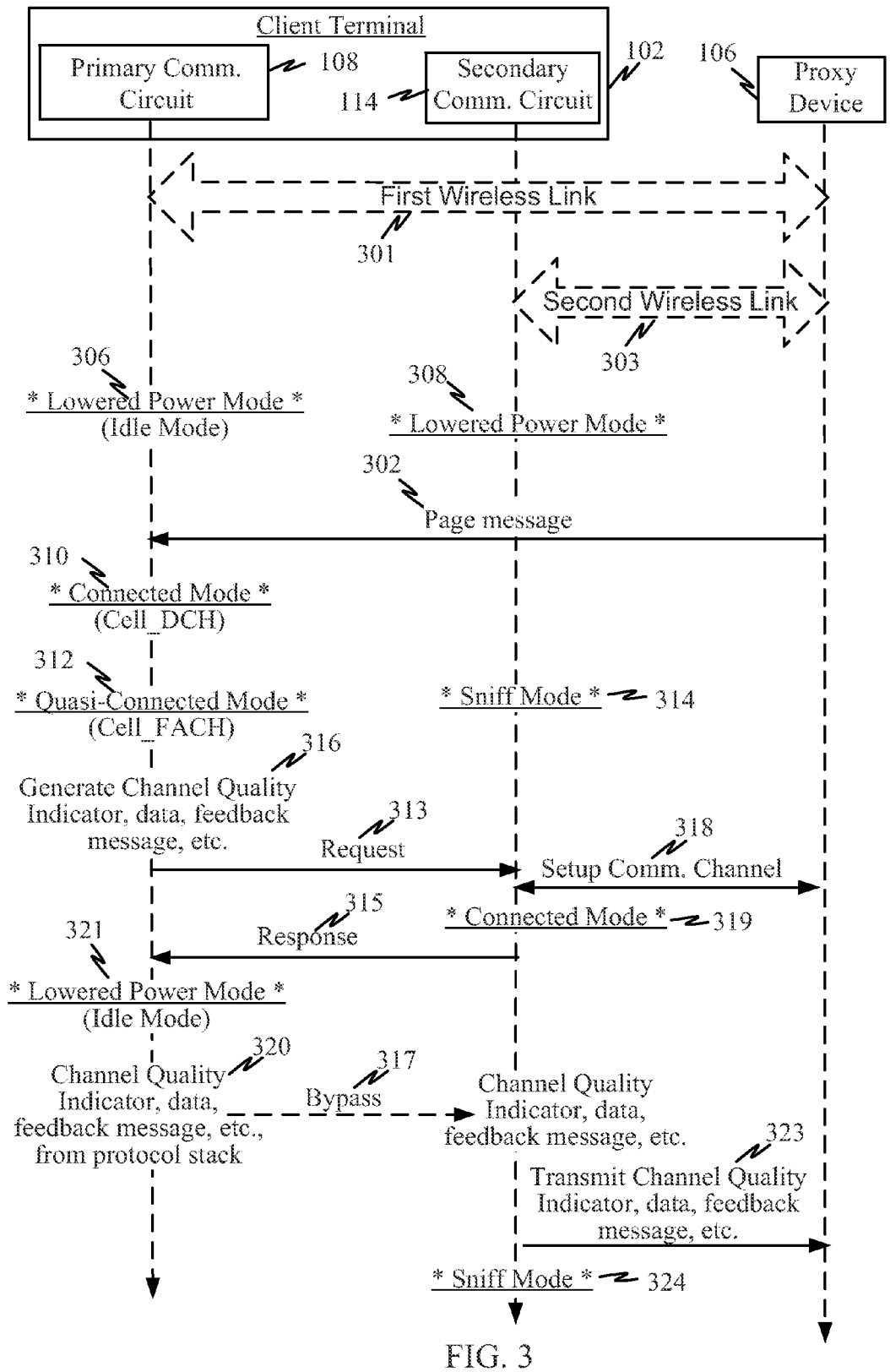
FIG. 3 is a flow diagram illustrating the operation of a wireless communication system where certain uplink communications from a client terminal may be sent over out-of-band signaling when the client terminal operates in a transition state of a connected mode.

FIG. 3 is a flow diagram illustrating the operation of a wireless communication system where certain uplink communications from a client terminal may be sent over out-of-band signaling when the client terminal operates in a quasi-connected mode. This example illustrates one possible implementation of a client terminal 102 that may include a primary communication circuit 108 (e.g., a first communication interface) implementing, for example, Radio Resource Control (RRC) function according to Universal Mobile Telecommunications System (UMTS) Wideband Code Division Multiple Access (W-CDMA). The client terminal 102 may be in communication with a proxy device 106 (e.g., access node, femtocell, etc.) over one or more wireless channels. The client terminal 102 may include, for example, a primary communication circuit 108 and a secondary communication circuit 114 to communicate with the proxy device 106. Whether a communication channel is dynamically established or pre-established, the channel between the primary communication circuit 108 and the proxy device 106 is herein referred to as the first wireless link 301 and the channel between the secondary communication circuit 114 and the proxy device 106 is referred to as the second wireless link 303.

In this example, the client terminal 102 may be adapted to provide, for example, channel quality indicators, data, and/or feedback messages, collectively referred to herein as indicators, associated with the first wireless link 301 (i.e., uplink)

for the primary communication circuit 108 (e.g., channel quality indicators of the first wireless link 301). However, rather than using the primary communication circuit 108 to provide such information/messages, the client terminal 102 may utilize the secondary communication circuit 114 to send the indicators over the second wireless link 303. For instance, during a Cell_FACH operating state, the client terminal 102 may be adapted to bypass a physical layer of a wide area network (WAN) protocol stack for the primary communication circuit 108 and instead route the indicator(s) via the secondary communication circuit 114.

At a given point of operation, the primary communication circuit 108 may be placed in a lowered power mode 306 (e.g., idle mode) and the secondary communication circuit 114 may be placed in a lowered power mode 308 (e.g., idle mode). The primary communication circuit 108 may monitor a paging channel for a paging message 302. The client terminal 102 may also obtain one or more channel measurements reflecting the quality and/or characteristics (e.g., signal strength, interference, etc.) of the paging channel (and by implication the first wireless link) The primary communication circuit 108 may then change operating modes to a connected mode 310, which may include RRC state Cell_DCH, and eventually into a quasi-connected mode 312, such as RRC state Cell_FACH when instructed by the network due to network inactivity (e.g., relatively little or no network activity) to/from the client terminal 102. Note that the transition from the connected mode 310 to the quasi-connected mode 312 may be instructed by the network (via the proxy device 106) due to lower data activity via the first wireless link 301.

Conventionally, in the RRC state Cell_FACH, the client terminal utilizes a Random Access Channel (RACH) to transmit data and/or control messages in an Uplink direction (e.g., from the client terminal to the network) and the Forward Access Channel (FACH) to receive data and/or control messages in Downlink direction (e.g., from the network to the client terminal). In order to optimize reliability and power capacity, a conventional client terminal may transmit data and/or control messages (e.g., channel quality indicators, data, feedback messages) to a proxy device using a primary communication circuit. For example, in W-CDMA, the client terminal may transmit feedback data such as channel quality indicators (CQI) at regular intervals to facilitate, for instance, fast adaptive modulation and coding (AMC). Such AMC feedback control (e.g., quality indicators) may be used, for instance, in High-Speed Downlink Packet Access (HSDPA) which is an enhanced Third Generation (3G) mobile telephony communication protocol. In implementing HSDPA, a new transport layer channel (e.g., High-Speed Downlink Shared Channel (HS-DSCH)) may be defined which may use (as in the case of the W-CDMA specification) three physical layer channels: HS-SCCH, HS-DPCCH and HS-PDSCH. The Uplink High Speed-Dedicated Physical Control Channel (HS-DPCCH) serves to carry acknowledgment information and current channel quality indicator (CQI) from the client terminal to the network. This quality indicator may then be used by the network or access node to calculate how much data to send to the client terminal on the next transmission. However, in quasi-connected mode (e.g., Cell_FACH mode), there is no HS-DPCCH channel present to send AMC feedback. Instead, while in quasi-connected mode, the client terminal may use the RACH.

The quasi-connected mode may be efficient for relatively infrequent message transmissions to/from a client terminal, since no power control is performed on the RACH and FACH. Hence, there is no radio layer signaling overhead in this mode, which leaves more air interface capacity for other client terminals and also saves battery capacity. However, the RACH is relatively inefficient for more frequent data message transmissions. For example, there is relatively high latency associated with the RACH, the RACH is terminated at the radio network controller (RNC) as opposed to the access nodes, the RACH is a contention-based channel with power ramp-up procedures to acquire the channel and adjust transmission power, and using the RACH increases uplink interference. Because of the inefficiencies of the RACH, data messages such as feedback data transmissions (e.g., CQI reporting) may not be transmitted relatively frequently in conventional devices.

According to one feature, the client terminal 102 may bypass the less efficient channels (e.g., RACH) typically implemented by the primary communication circuit 108 when operating in a quasi-connected mode 312 (e.g., RRC state Cell_FACH), and instead utilizes the relatively more efficient secondary communication circuit 114 for data and/or control message communications. Therefore, the primary communication circuit 108 is in the quasi-connected mode 312 while the secondary communication circuit 114 is in a Sniff Mode 314. In Sniff Mode 314 (e.g., for a Bluetooth-compliant interface), the secondary communication circuit 114 may not be actively connected to the proxy device 106, but is in a state in which it is prepared to make such a connection by sending periodic keep alive packets.

In the quasi-connected mode 312, the client terminal 102 may generate, for example, a channel quality indicator or other data/control message 316 to be sent to the proxy device 106. For instance, the channel quality indicator or other data/control message may be received from an application layer or a network layer (e.g., non-access stratum (NAS)) of a protocol stack identifying a data/control message has been processed or is being processed to be conveyed by the client terminal 102. In one example, such indicator or other data message 316 may be initially placed into the protocol stack associated with the primary communication circuit 108. Prior to reaching the physical layer of that protocol stack, the indicator and/or data/control message is bypassed to the secondary communication circuit 114. To do this, the primary communication circuit 108 may send a request 313 or notification to the secondary communication circuit 114 that a message is ready for transmission in the primary communication circuit protocol stack. After setting up a communication channel 318 with the proxy device 106, the secondary communication circuit 114 may change to a connected mode 319 and may respond 315 to the primary communication circuit 108 that it is able to transmit such message. The primary communication circuit 108 then switches from the network configured quasi-connected mode 312 to the lowered power mode 321. The indicator and/or data/control message from the protocol stack 320 is then bypassed 317 to the secondary communication circuit 114 which transmits the indicator and/or data/control message 323. Note that at least some layers of the protocol stack (e.g., higher layers of the protocol stack) for the primary communication circuit may operate as it would in the quasi-connected mode 312 while lowered layers of the protocol stack (e.g., the physical and/or medium access control layers) of the primary communication circuit 108 operate according to the lowered power mode 321. In some implementations, the protocol stack may be shared between primary and secondary communication circuits 108 and 114 so that the secondary communication circuit 114 extracts the indicator and/or data/control message 316 from a lower layer (e.g., MAC layer or PHY layer) of the protocol stack. In other implementations, the secondary communication circuit 114 may have its own secondary protocol stack so that the indicator and/or data/control message 316 are extracted a lower layer (e.g., MAC layer or PHY layer) of the protocol stack and placed in the secondary protocol stack In this manner any message (e.g., indicator 316) may be moved to the secondary communication circuit 114 for transmission to the proxy device 106 via a secondary channel, thereby bypassing parts of the primary communication circuit 108. After transmission, the secondary communication circuit 114 may switch back to Sniff Mode 324. The proxy device 106 may then forward the received channel indicator to the network. In this manner, various types of data and/or control signaling may be communicated between the secondary communication circuit 114 and the proxy device 106.

Using the secondary communication circuit 114 instead of the primary communication circuit 108 for communicating messages (e.g., channel quality indicator, data and/or control information, etc.) between the client terminal 102 and the proxy device 106 when the client terminal 102 is operating in a quasi-connected mode (such as Cell_FACH) enables the client terminal 102 to transmit messages (e.g., including messages carrying control and feedback data) more frequently. More frequent transmission of feedback data, such as CQI reports, may enable the proxy device 106 or other communication network device to schedule downlink transmissions more accurately leading to improved downlink performance. Furthermore, the proxy device 106 or other communication network device may be better able to allocate resources to match the channel conditions of the client terminal 102 and avoid unnecessary retransmissions and wastage of power and codes. This approach may also reduce uplink interference on the first wireless link 301 (e.g., a wide area network) since a different communication link (i.e., the second communication link 303) is utilized. That is, by moving certain communications to the second wireless link 303, this reduces the interference that would otherwise be observed by other wireless devices in the vicinity due to transmissions over the first communication link 301. Additionally, because the delay in sending the CQI over the secondary communication circuit 114 (e.g., Bluetooth delay+Sniff delay) may be lower than the first communication circuit 108 (e.g., RACH procedure), then the time to send the CQI is reduced. Additionally, because the transmit power of the secondary communication circuit 114 (e.g., a Bluetooth-compliant transmitter ~30 mA) may be lower than the primary communication circuit 108 (e.g., a WAN transmitter in Cell_FACH~120 mA), the client terminal 102 may conserve power. Due to the increased frequency of reporting the channel measurements (CQI) (because the second wireless link 303 can be setup more quickly), the proxy device 106 may schedule downlink transmissions more accurately leading to downlink performance. Also, the increased frequency of reporting the channel measurements (CQI) may allow the proxy device 106 to avoid unnecessary retransmissions and waste of power resources.

Figure 4:
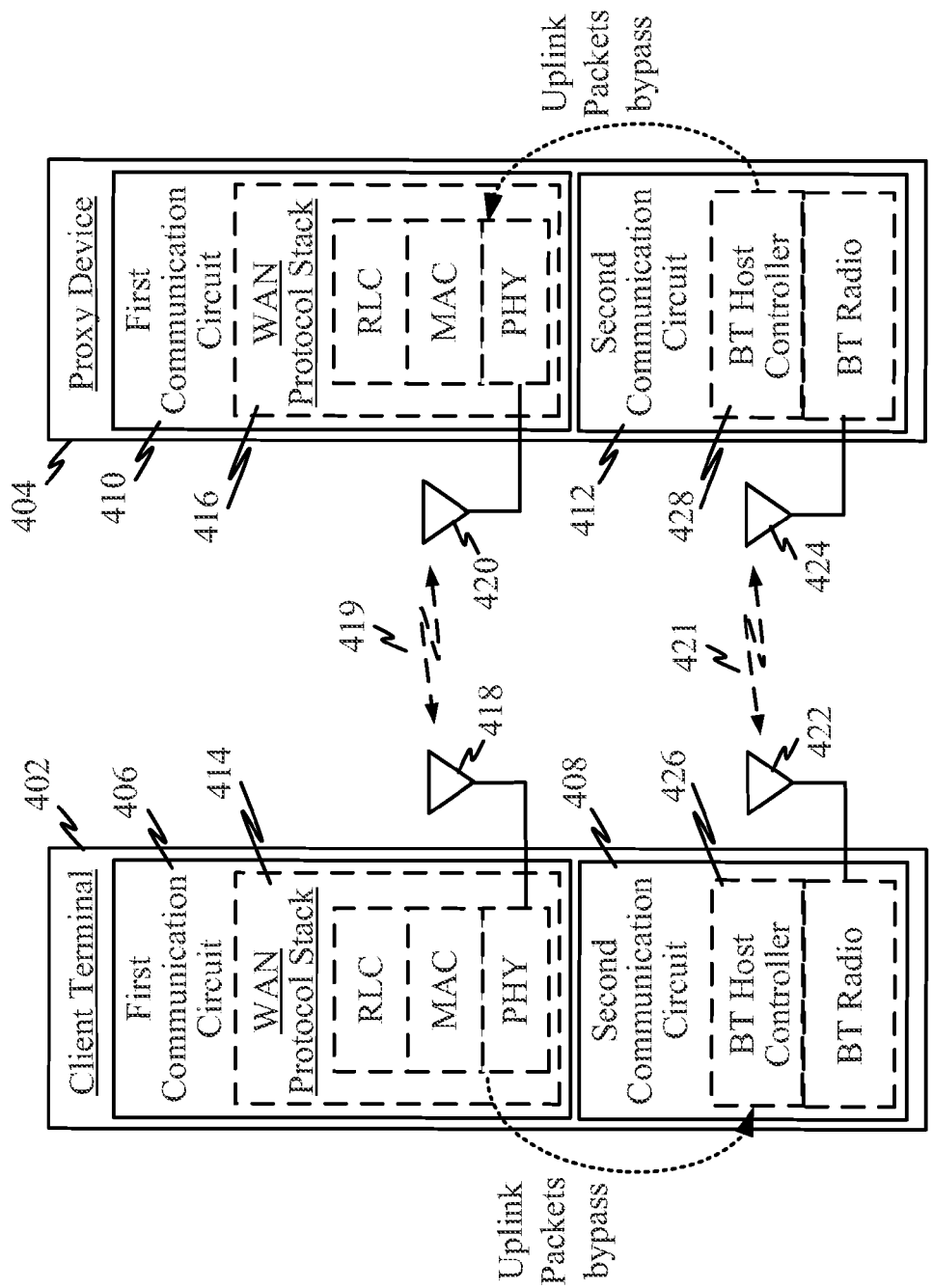
FIG. 4 is a block diagram illustrating an example of a communication system in which a client terminal uses out-of-band signaling to communicate with a proxy device, thereby avoiding transmissions over a wide area network channel.

FIG. 4 is a block diagram illustrating an example of a communication system in which a client terminal uses out-of-band signaling to communicate with a proxy device, thereby avoiding transmissions over a wide area network channel. In this example, the communication system may include a client terminal 402 in communication with a proxy device 404.

The client terminal 402 may include a first (primary) communication circuit 406 coupled to a first antenna 418 and a second (secondary) communication circuit 408 coupled to a second antenna 422. Similarly, the proxy device 404 may include a first (primary) communication circuit 410 coupled to a first antenna 420 and a second (secondary) communication circuit 412 coupled to a second antenna 424. The first communication circuits 406 and 410 may be adapted to wirelessly communicate with each other over a first communication link 419 (e.g., first frequency or first channel). In this example, the first communication circuits 406 and 410 may each implement a wide area network (WAN) protocol stack 414 and 416 which may include, for example a Radio Link Control (RLC) layer, a Media Access Control (MAC) layer, and/or a Physical (PHY) layer. Similarly, the second communication circuits 408 and 412 may also be adapted to wirelessly communicate with each other over a second communication link 421 (e.g., second frequency or second channel). In this example, the second communication circuits 408 and 412 may each implement a Host Controller and a Radio, e.g., Bluetooth-compliant.

To conserve power, improve performance, and/or reduce interference on the wide area network (via the first communication link), the client terminal 402 may be adapted to bypass certain communications over the first communication link 419 when operating in a particular quasi-connected mode (e.g., Cell_FACH). For instance, the client terminal 402 may be adapted with a trigger that operates when the first communication circuit is operating in the quasi-connected mode. When a data/control message or indicator is placed in the WAN protocol stack 414, the trigger may cause the data/control message or indicator to be removed from the WAN protocol stack 414 (e.g., from the MAC layer or PHY layer) and sent to the second communication circuit 408 for transmission over the second communication link 421 to the proxy device 404. The message may be encapsulated into a packet at the second communication circuit 408, so the receiving second communication circuit 412 knows how to process the message. For instance, the packet may include an indicator in its header that identifies it as a bypass message, allowing the proxy device 404 to recognize that such message should be placed on the WAN protocol stack 416.

At the proxy device 404, the second communication circuit 412 receives the message/indicator over the second communication link 421, strips it from its encapsulation, and may place or insert it into the WAN protocol stack 416 (e.g., at the MAC layer or PHY layer) of the first communication circuit 410. From the WAN protocol stack 416, the message/indicator may be processed as if it would have been received via the first communication link 419 instead of the second communication link 421. For example, the proxy device 404 may then forward the message and/or indicator (e.g., via another communication interface) to another network.

Active Synchronization Using Proxy Device Assistance

Figure 5:
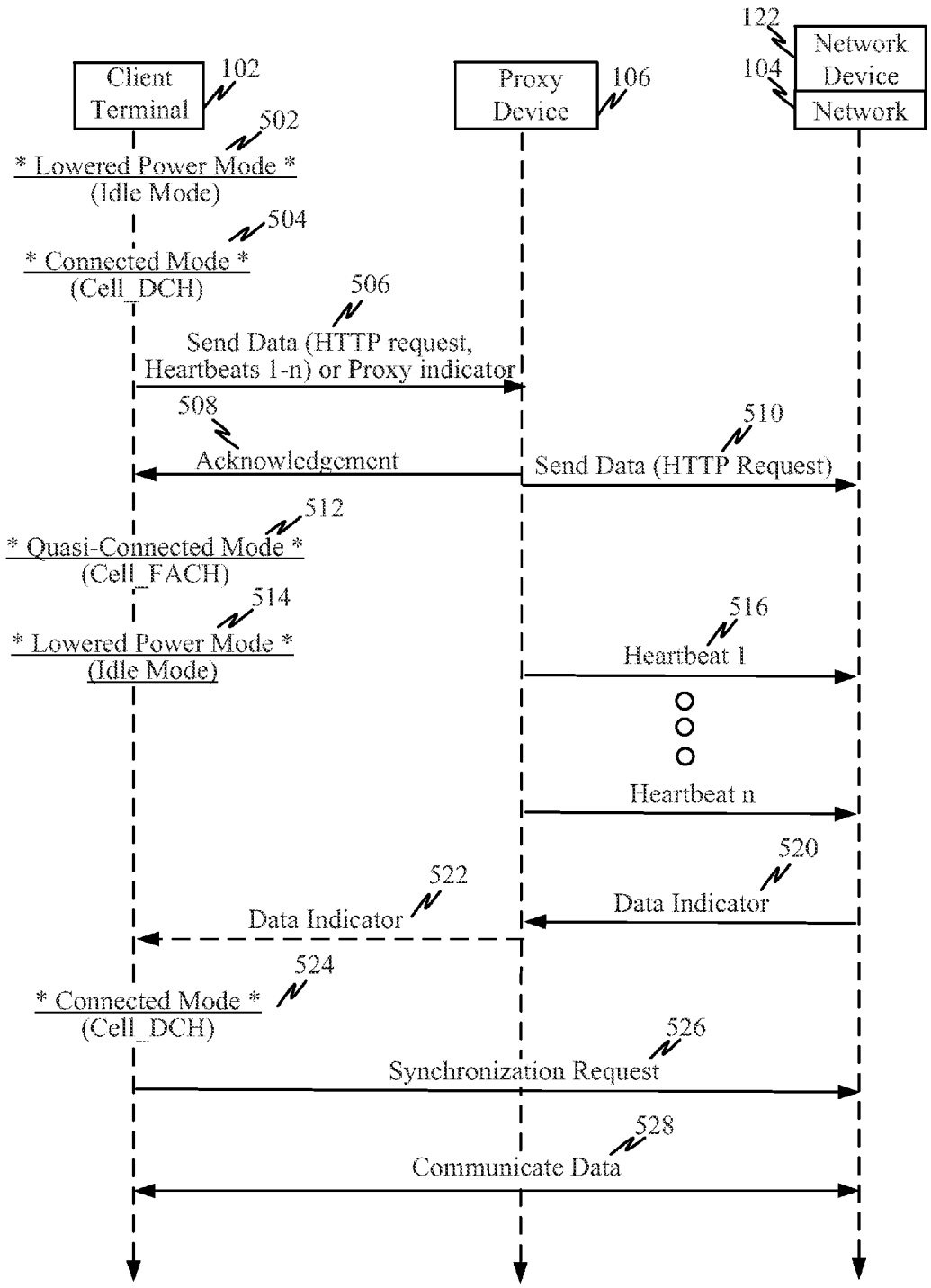
FIG. 5 is a flow diagram illustrating an example of active synchronization where a client terminal may assign a proxy device to perform some of its tasks to maintain an active connection, thereby allowing the client terminal to operate in a lower power consumption mode.

FIG. 5 is a flow diagram illustrating and example of active synchronization where a client terminal may assign a proxy device to perform some of its tasks to maintain an active connection, thereby allowing the client terminal to operate in a lower power consumption mode. As noted above, with reference to FIGS. 1, 3 and 4, the client terminal 102 may communicate with the network 104 by means of a proxy device 106 using a first communication circuit when operating in a connected or quasi-connected mode, or using a second communication circuit when operating in a lowered power mode.

The client terminal 102 may operate in a lowered power mode 502 (e.g., a primary communication circuit operates in idle mode) when a data request 506 is generated by a program or application operating on the client terminal 102. For example, an instant messaging application, voice over IP (VOIP) application, push email, and/or other connected program or application may request a connection to some entity on the network (e.g., an Hypertext Transfer Protocol HTTP request) and the client terminal 102 may switch to a connected mode 504 (e.g., the primary communication circuit switches to connected mode), such as RRC state Cell_DCH.

In conventional client terminals, the program or application may require an active connection to the network and will accordingly send a signal (or heartbeat) to the network (e.g., via the primary communication circuit) to keep the connection active and insure the network does not close the connection as a result of inactivity. Note that a client terminal may setup such connection to the network either directly or via a proxy device. Such conventional client terminals may switch from an idle mode to a connected mode or quasi-connected mode each time a heartbeat is to be sent. Such periodic switching of the primary communication circuit to a connected mode is wasteful of power resources on the client terminal.

Therefore, according to one feature, the client terminal 102 may be adapted to send the data 506 (e.g., as an HTTP request) together with a specified number of heartbeats to a proxy device 106 which may indicate to the proxy device 106 that it should act as a proxy for client terminal 102. The proxy device 106 may send an acknowledgement 508 to the client terminal 106 and may send the data 510 to the network 104. The client terminal 102 may change its operating mode to a quasi-connected mode 512 as instructed by the network 104 or network device 122, which may include RRC state Cell_FACH. Eventually, the client terminal 102 may switch to a lowered power mode 514 (e.g., idle mode) when no network activity is present to/from the client terminal 102. Note that the wireless network 104 may or may not be aware that the client terminal 102 has changed from the connected mode 504 or the quasi-connected mode 512 to the lowered power mode 514. Once the client terminal 102 switches to lowered power mode (e.g., where the primary communication circuit is completely, substantially or periodically shut-off or disabled), it no longer sends a keep-alive signal (heartbeat), but instead relies on the proxy to send such keep-alive signal (heartbeat). Each time a heartbeat is required to keep the program or application connected to the network 104, the proxy device 106 may convey the heartbeat 516 (on behalf of the client terminal 102) to the proper network entity. By employing the proxy device 106 to monitor or keep alive network connections on behalf of the client terminal 102, the client terminal 102 may achieve substantial power savings since, for example, the client terminal 102 may spend more time in the lowered power mode (e.g., idle mode).

While in the lowered power mode, where the primary communication circuit for the client terminal is inactive, the client terminal 102 may utilize a second communication circuit (e.g., a lower power communication interface than that of the primary communication circuit) to receive notifications from the proxy device 106. When a data indicator 520 (e.g., a paging signal or message) is sent from the network for the one or more programs or applications operating in the client terminal 102, the proxy device 106 receives the data indicator 520 and forwards the data indicator 522 to the client terminal 102 via the second communication circuit. Upon receipt of the data indicator by its second communication circuit, the client terminal may switch to a connected mode 524 (e.g., Cell_DCH), where the primary communication circuit becomes active again. The client terminal 102 may then request synchronization 526 directly with the network 104 (e.g., synchronization via the primary communication circuit) and data 528 may be communicated between the client terminal 102 and the network 104.

Exemplary Client Terminal

Figure 6:
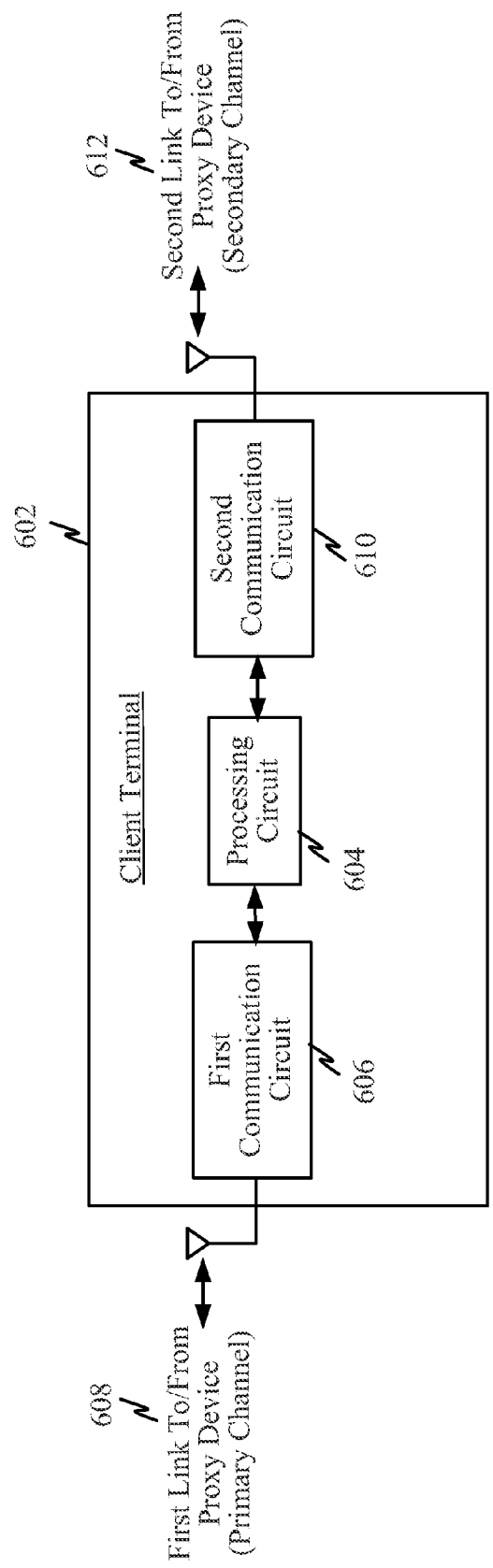
FIG. 6 is a block diagram of an example of a client terminal configured for data communication with a proxy device by using a first communication circuit and a second communication circuit.

FIG. 6 is a block diagram of an example of a client terminal configured for communication with a proxy device by using a first communication circuit and a second communication circuit. The client terminal 602 may include a processing circuit 604, such as a small and/or low-power microprocessor. The client terminal 602 may also include a first (e.g., primary) communication circuit 606 that allows the client terminal 602 to communicate with a proxy device on a first wireless communication link 608 (primary link). For example, the first communication circuit 606 may be a high power communication interface used for long range communications (e.g., wide area network), such as over a CDMA-compliant network. The client terminal 602 may also include a second (e.g., secondary) communication circuit 610 communicatively coupling the client terminal 602 to the proxy device on a second wireless communication link 612 (e.g., secondary channel) to the proxy device. For example, the second communication circuit 610 may be a low power communication circuit used for short range communications, such as over a Bluetooth-compliant network. The client terminal 602 may be battery-powered and the amount of power such battery can provide is limited. Consequently, the client terminal 602 may be adapted to perform one or more of the power-conservation features illustrated in FIGS. 3-5.

In conventional client terminals, the first communication circuit of a client terminal is used for monitoring data/control channels and communicating data/control messages to the proxy device whenever the client terminal is operating in any of its various connected or quasi-connected operating modes. For instance, in a quasi-connected mode such as the RRC state Cell_FACH, the primary communication circuit of conventional client terminals utilizes a Random Access Channel (RACH) to transmit messages (e.g., CQI) in uplink and the Forward Access Channel (FACH) to receive messages in downlink. However, the RACH is relatively inefficient for more frequent message transmissions, such as feedback transmissions (e.g., CQI reporting).

The client terminal 602 may be configured to achieve improved communication with the proxy device 608 by using a second or secondary communication circuit 610 when in a quasi-connected mode. To achieve this, the client terminal 602 may be adapted to perform one or more operations via its processing circuit 604, first communication circuit 606 and/or second communication circuit 610. That is, the processing circuit 604 may be adapted (e.g., programmed) to switch communications from the first communication circuit 606 to the second communication circuit 610 for power conservation purposes. For example, in typical connected or quasi-connected mode the processing circuit 604 of the client terminal 602 may cause messages to be conveyed to/from the proxy device using the first communication circuit 606. However, to conserve power when the client terminal 602 operates in the quasi-connected mode, the processing circuit 604 may be configured to bypass the first communication circuit 606, or at least portions thereof, and instead utilize the second communication circuit 610 to convey messages to/from the first communication circuit protocol stack.

By way of example and not limitation, in at least some embodiments, the processing circuit 604 may be adapted to process messages through the various layers of a protocol stack to form one or more packets of data or control information. For example, the processing circuit 604 may be adapted to prepare (i.e., process) messages to be conveyed using the RACH while operating in the quasi-connected mode of RRC state Cell_FACH. Such a protocol stack may include a Radio Link Control (RLC) Layer, a Medium Access Control (MAC) Layer, a Physical (PHY) Layer, as well as others and a buffer may be employed for processing each layer of the protocol stack. When the packetized message (including data and/or control information) is processed through each layer of the protocol stack and is ultimately located on the PHY buffer, the message may be in a state ready to be transmitted using the RACH via the first communication circuit 610. However, when operating in a quasi-connected mode, the processing circuit may be adapted to bypass the first communication circuit 606, and use the second communication circuit 610 to convey the packetized message. Accordingly, the packetized messages are read from the PHY buffer (or some other layer of the protocol stack) to the second communication circuit 610, where the packetized messages are conveyed using the second communication link.

Figure 7:
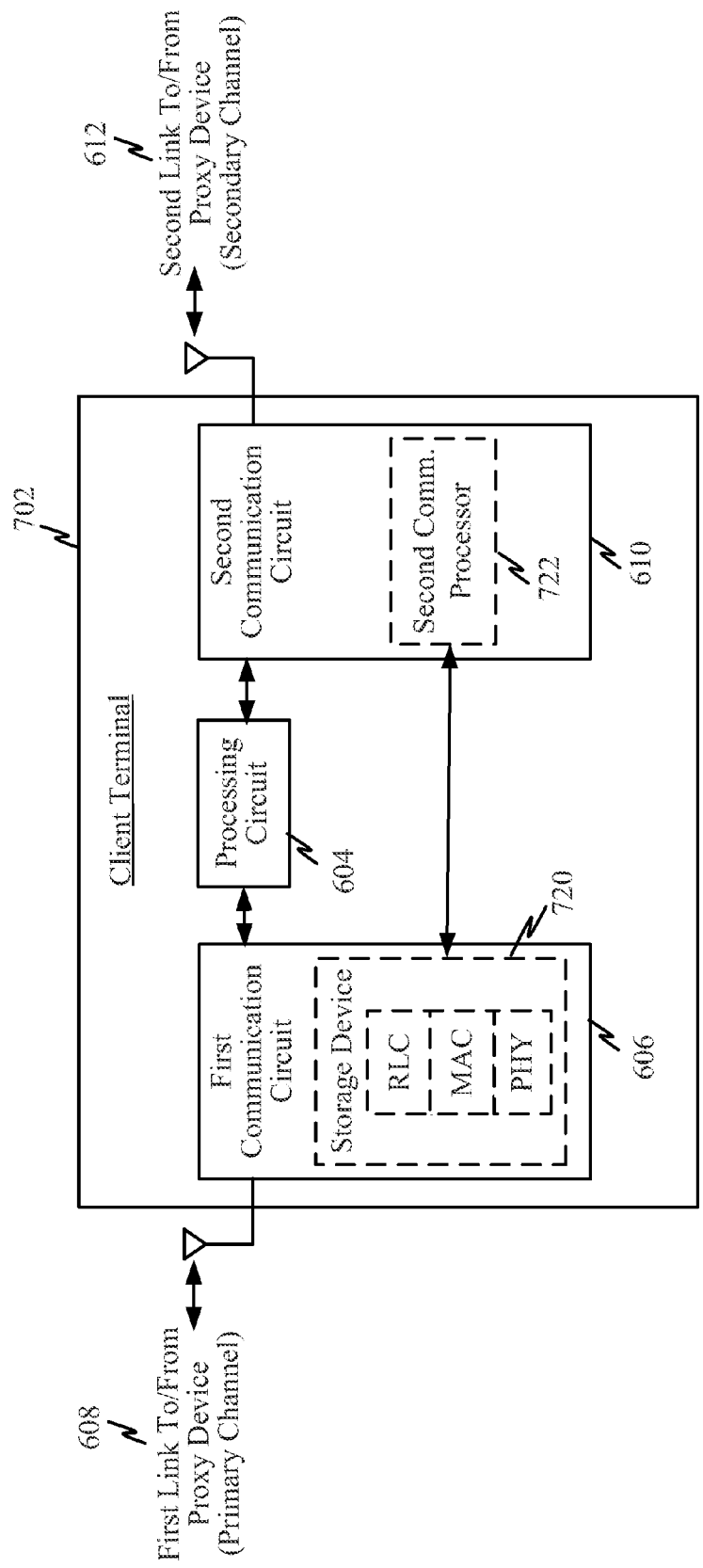
FIG. 7 is a block diagram of select components of a client terminal according to at least one embodiment for providing the secondary communication circuit access to a storage device.
Figure 8:
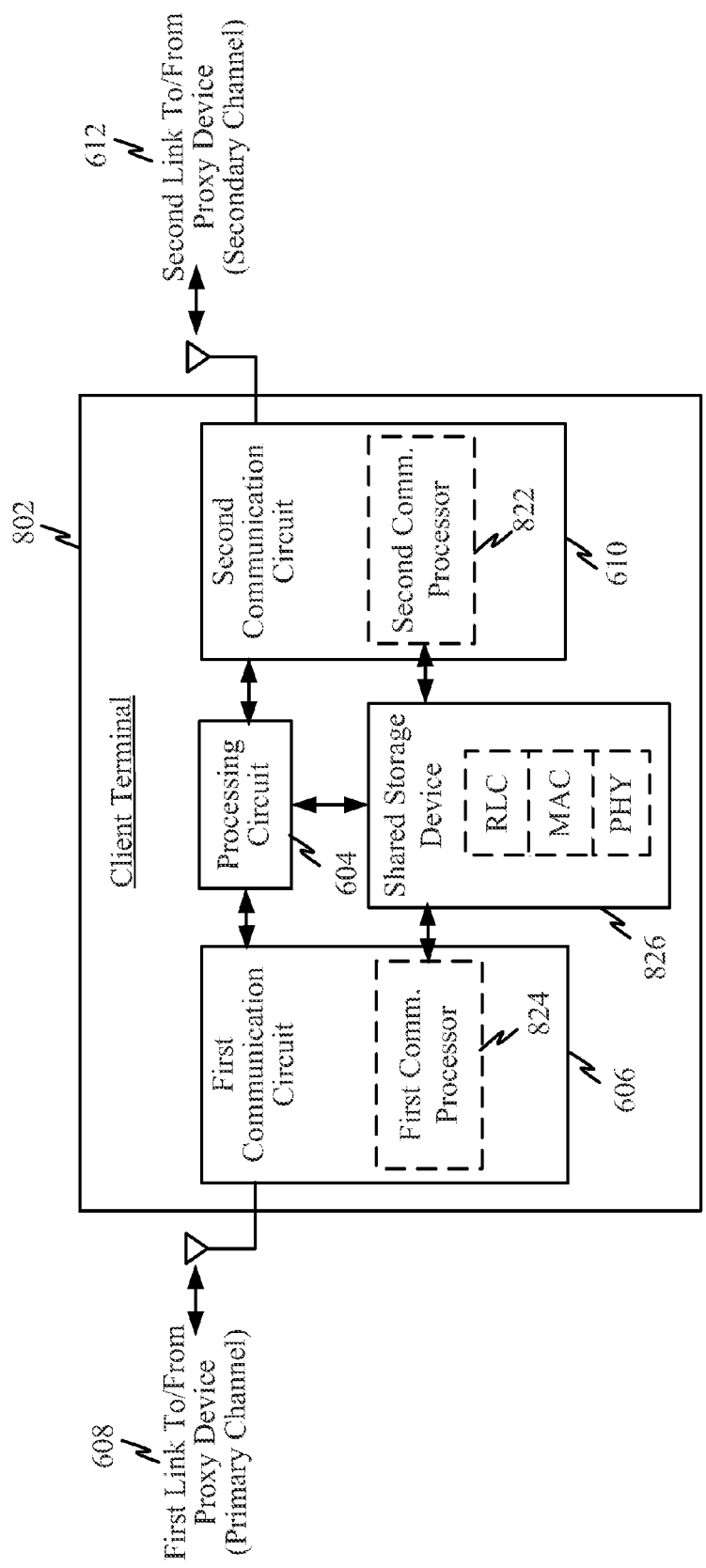
FIG. 8 is a block diagram of select components of a client terminal according to at least one other embodiment for providing the secondary communication circuit access to a storage device.

In at least some embodiments, the second communication circuit 610 may be configured to obtain the packetized data messages from a storage device or media adapted to implement the protocol stack or buffer in order to bypass the first communication circuit 606. FIGS. 7 and 8 illustrate alternative exemplary embodiments of the client terminal 602.

FIG. 7 is a block diagram of select components of a client terminal 702 according to at least one embodiment for providing the second communication circuit access to a storage device. As shown, the first communication circuit 606 may include storage device 720 adapted to implement a protocol stack buffer. Such a protocol stack may include a plurality of buffers including a Radio Link Control (RLC) Layer buffer, a Medium Access Control (MAC) Layer buffer, and a Physical (PHY) Layer buffer. In order to bypass the first communication circuit 606 and use the second communication circuit 610, the second communication circuit 610 may be configured to read the data or control message from at least one of the protocol stack buffers when the client terminal 602 switches to quasi-connected mode. For example, the second communication circuit 610 may include a second communication processor 722 adapted to read messages that have been packetized (i.e., prepared for transmission via the first communication circuit 606) and placed in one of the buffers in the storage device 720. The packetized data read from the buffer may then be prepared (e.g., encapsulated) for transmission by the second communication circuit 610, and then transmitted via the secondary link 612 to the proxy device.

FIG. 8 is a block diagram of select components of a client terminal 802 according to at least one other embodiment for providing the secondary communication circuit 610 access to a storage device. The first communication circuit 606 may include a first communication processor 824 and the second communication circuit 610 may include the second communication processor 822. Both the first communication processor 824 and the second communication processor 822 may be coupled to a shared storage device 826. The shared storage device 826 may be adapted to implement a protocol stack buffer including a plurality of buffers. Messages may be processed for transmission using the first communication circuit 606 (e.g., packetized according to a particular protocol stack) and stored in a buffer of the protocol stack buffer. The first communication circuit 606 may read packetized messages from the shared storage device 826 when the client terminal 602 is operating in a connected mode. When the client terminal 602 switches to a quasi-connected mode, the first communication processor 824 may be adapted to stop reading packetized data messages from the shared storage device 826, and the second communication processor 822 may begin reading, processing and conveying the packetized messages read from the shared storage device 826.

It should be noted that although FIGS. 7 and 8 show client terminals 702 and 802 comprising multiple processing circuits (e.g., processing circuit 604, first communication processor 824 and second communication processor 722/822), the multiple processing circuits may be implemented as a single processing circuit according to various embodiments.

According to additional features, at least some embodiments of a client terminal 602 may be configured for power conservation by switching to a third mode (e.g., a lowered power mode such as idle/sleep mode) and using the proxy device to monitor network connections (e.g., an internet connection).

Modern client terminals may run various program applications that utilize internet or other network connectivity on a substantially continuous basis. For example, instant messaging applications, voice over IP (VOIP) applications, push email, and other connected program applications. Conventionally, the client terminal transmits and receives several IP packets per minute via a first communication circuit to keep the connection to the servers on the network active for each of the various program applications. In addition to using a second communication circuit to transmit and receive these low-rate data messages as described herein above, at least some embodiments of a client terminal 602 may be configured to request that a proxy device act as its proxy to monitor such connections to the servers and to transmit such IP packets to keep the network connections active.

While the proxy device acts as a proxy, the client terminal may be configured to switch from a connected mode or quasi-connected to a lowered power mode (e.g., idle/sleep mode). In the lowered power mode, the processing circuit 604 may assign the second communication circuit 610 to determine if the proxy device has forwarded a message. If a message is received for an application on the client terminal via the second communication circuit 610, the processing circuit 604 may switch to a quasi-connected mode or a connected mode. If the processing circuit 604 changes the client terminal 602 to the quasi-connected mode, the processing circuit 604 may continue communications with the network via the proxy device using the second communication circuit 610. If the processing circuit 604 changes to the connected mode, the processing circuit 604 may activate the first communication circuit 606 to communicate with the network through the proxy device.

Figure 9A:
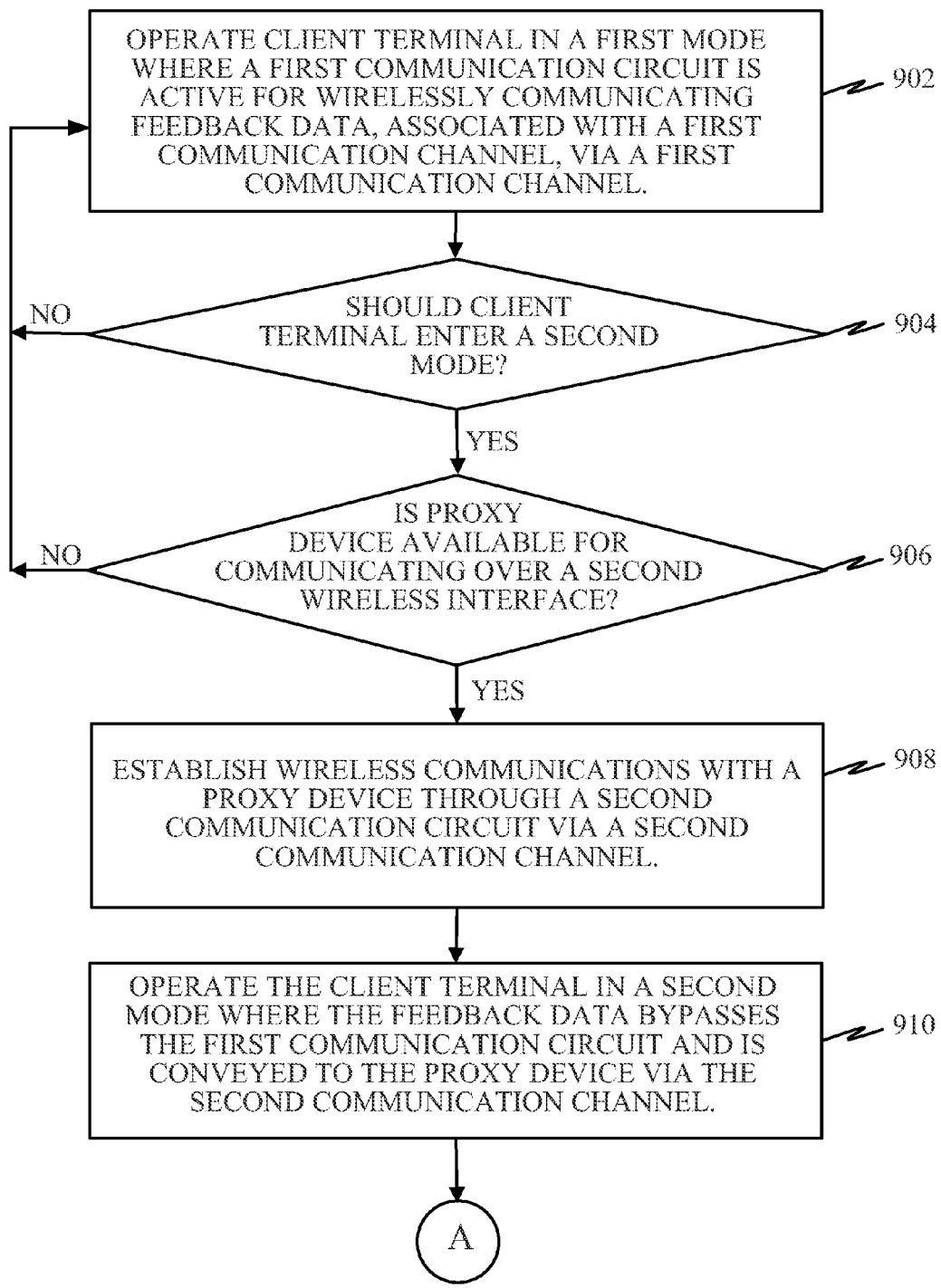
FIG. 9 (comprising FIGS. 9A and 9B) is a flow diagram illustrating a method operational in a client terminal for improved data communication with a proxy device.
Figure 9B:
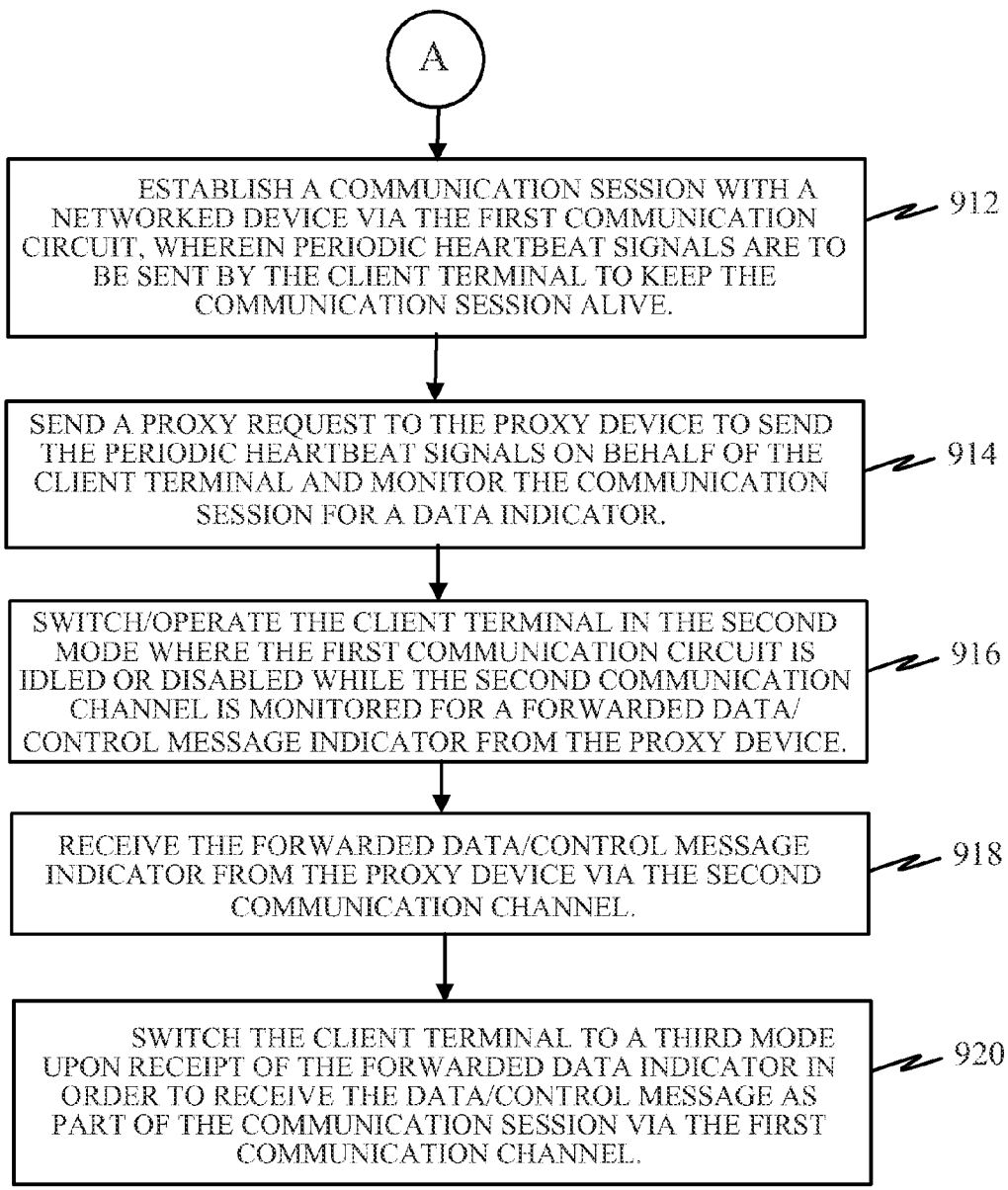

FIG. 9 (comprising FIGS. 9A and 9B) is a flow diagram illustrating a method operational in a client terminal for improved data communication with a proxy device. As illustrated herein, the client terminal may be adapted to perform (a) channel measurement feedback using out-of-band signaling via a proxy device and/or (b) active synchronization with assistance of a proxy device. Note that the methods illustrated in FIGS. 9A and 9B may be performed together or independently (separate) from each other.

In performing channel measurement feedback via the proxy device, the client terminal may initially operate in a first mode (e.g., quasi-connected mode or perhaps a connected mode) where a first (e.g., primary) communication circuit is at least partially active for wirelessly communicating feedback data or control information associated with a first communication channel via a first communication channel 902. For example, the first communication circuit may be a high power or long range communication circuit for a wireless network and the first mode may be a quasi-connected mode (Cell FACH). In the quasi-connected mode, the client terminal may communicate over and/or monitor a data channel with the proxy device. For example, messages may be processed according to a wide area network (WAN) protocol stack in which the messages are packetized adapted for conveyance using the first communication circuit. The first communication circuit may then convey to the proxy device the packetized messages located in a physical layer buffer. Such messages may include feedback data or control information representative of one or more characteristics of the first communication channel as perceived by the client terminal. That is, the feedback data or control information may include channel measurements (e.g., frequency spectrum measurements) taken by the client terminal and reported to the network. To obtain the feedback data, the client terminal may monitor the first communication channel to ascertain one or more channel conditions and then generates the feedback data based on the ascertained one or more channel conditions.

During operation in quasi-connected mode, the client terminal may determine that it should enter a second mode (e.g., lowered power mode) 904. For example, if reduced activity is observed on the data channel for a threshold amount of time (e.g., x number of packets between the client terminal and proxy device in the last y seconds), then the client terminal may attempt to improve channel efficiency and conserve power by switching to the second mode (e.g., UMTS RRC State—idle mode). To do this, the client terminal may first determine whether a proxy device is available for communicating over a second wireless interface (e.g. using the second wireless circuit) 906. If so, then the client terminal may establish wireless communications with the proxy device through a second communication circuit via a second communication channel 908. For example, if the secondary communication circuit is a Bluetooth compliant circuit, the proxy device may be configured to operate according to a pseudo-random sequence called a hop sequence or frequency hop sequence so that the proxy device and the client terminal can communicate with each other via their respective secondary communication circuits.

Once a communication link/channel via the second communication circuit is established between the client terminal and the proxy device, the client terminal may switch to operate in a second mode (e.g., a lowered power mode) where the first communication circuit is bypassed and feedback data (or data and/or control information) is conveyed to/from the proxy device using the second communication circuit 910. For instance, the client terminal may extract the feedback data from a buffer for the first communication circuit and then transmits the feedback data via the second communication circuit. For example, packetized data/control messages located in a physical layer buffer that have been processed to be conveyed by the first communication circuit are made available to the second communication circuit when the client terminal is operating in the quasi-connected mode. The second communication circuit reads the data/control messages from the physical layer buffer and adapts (e.g., encapsulates) the packetized data/control messages for conveyance to the proxy device via the second communication circuit. In implementations in which the second communication circuit is a Bluetooth compliant circuit, the packetized data/control messages that have been processed for transmission via the first communication circuit may be read from a physical layer buffer and encapsulated within a Bluetooth communication packet.

In performing active synchronization with assistance of a proxy device via the second communication circuit, the client terminal may also use the proxy device. The client terminal may request that the proxy device monitor network connections for one or more programs and/or applications in order to keep the network connections active for the one or more programs or applications and to monitor for data/control messages from the network for the one or more programs and/or applications. That is, during a connected mode of operation, the client terminal may establish a communication session (e.g., network connection for one or more programs and/or applications) with a networked device via the first communication circuit, wherein periodic heartbeat signals are to be sent by the client terminal to keep the communication session alive 912. However, rather than actually sending periodic heartbeat signals (e.g., keep-alive signal) itself, the client terminal may send a proxy request to the proxy device to send the periodic heartbeat signals on behalf of the client terminal and monitor the communication session for a data indicator 914. The client terminal may then be operated or switched to the second mode (e.g., lowered power mode) where the first communication circuit is idled or disabled while the second communication channel is monitored for a forwarded data/control message indicator from the proxy device 916.

Subsequently, upon receipt of a data indicator by the proxy device, the client terminal may receive the forwarded data/control message indicator from the proxy device via the second communication channel 918. Upon receipt of such forwarded data/control message indicator (e.g., which may indicate data or control information is being transmitted to the client terminal in the communication session), the client terminal may switch to a third mode (e.g., a connected mode) in order to receive the data/control message as part of the communication session via the first communication channel 920.

Exemplary Proxy Device

Figure 10:
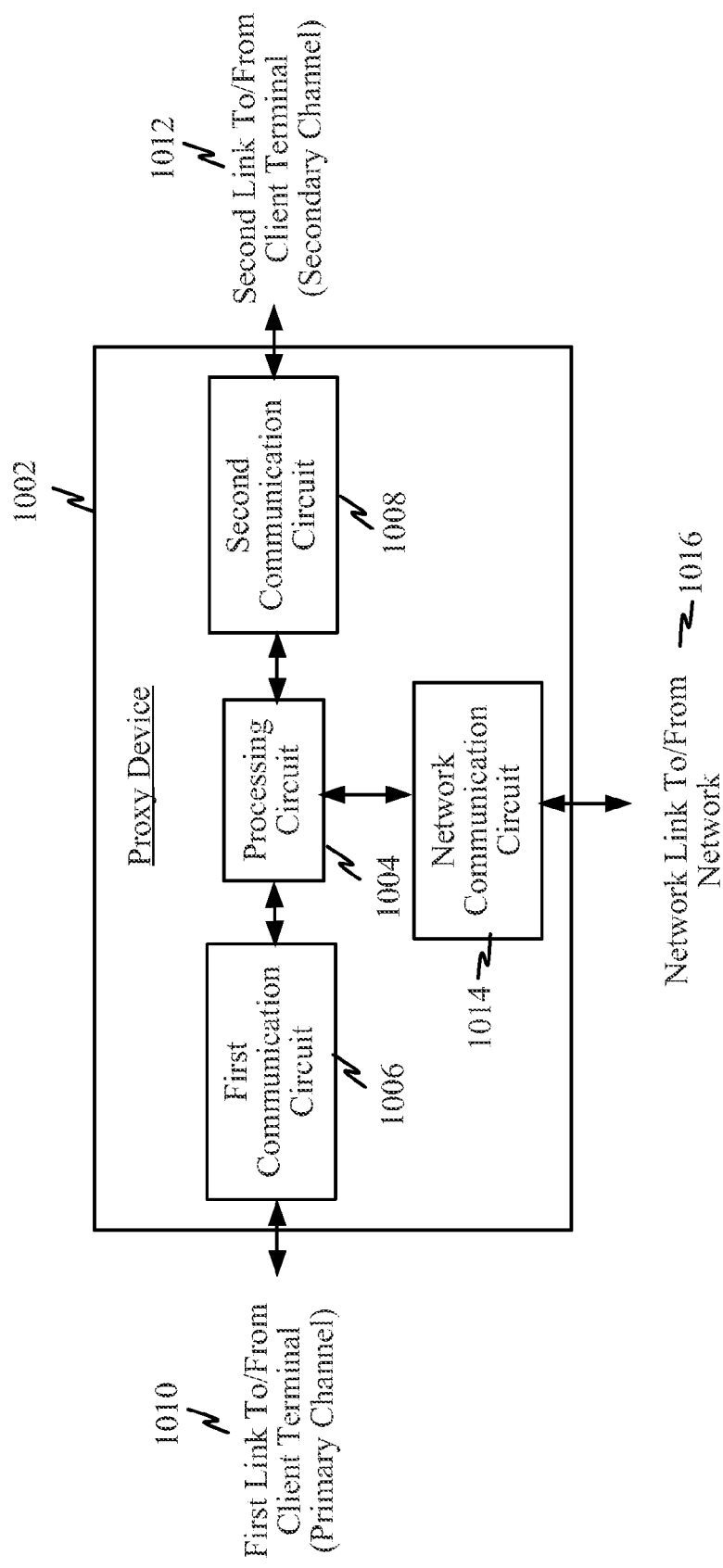
FIG. 10 is a block diagram of an example of a proxy device configured to communicate with one or more client terminals using a first wireless link and a second wireless link.

FIG. 10 is a block diagram of an example of a proxy device configured to communicate with one or more client terminals using a first wireless link and a second wireless link. The proxy device 1002 may include a processing circuit 1004 coupled to a first (e.g., primary) communication circuit (or interface) 1006, a second (e.g., secondary) communication circuit (or interface) 1008, and/or a network communication circuit (or interface). The proxy device 1002 may use the network communication circuit 1014 to directly couple to a communication network via a (wired or wireless) network link 1016. Through the network communication circuit 1014, the proxy device 1002 may be able to forward communications to/from client terminals being served by the proxy device 1002 and/or receive other network related information. The proxy device 1002 may be configured to operate as an access node. As used herein, an access node may be a device that can wirelessly communicate with one or more terminals and may also be referred to as, and include some or all the functionality of, a base station, Node-B device, femto cell, pico cell, macro cell, or some other similar devices. In examples where the proxy device 1002 is a femtocell, it may include one or more wireless communication circuits/interfaces for wireless communications and network communication circuit/interface for landline or broadband network connections.

The first communication circuit 1006 may communicatively couple the proxy device 1002 to a client terminal using a first wireless communication link 1010. For example, the first communication circuit 1006 may be a high power circuit used for long range communications, such as over a CDMA-compliant network. The first communication circuit 1006 may further be adapted to communicatively couple the proxy device 1002 to a communication network and/or one or more access nodes of the communication network. Data/control messages sent from a client terminal using the first wireless communication link 1010 are received by the first communication circuit 1006 and may be temporarily stored or written to a protocol stack buffer associated with the first communication circuit 1006 for processing.

The second communication circuit 1008 may be used to couple the proxy device 1002 to the client terminal using a second wireless communication link 1012. For example, the second communication circuit 1008 may be a lower power circuit used for short range communications, such as over a Bluetooth-compliant network. The processing circuit 1004 may be adapted (e.g., programmed) to receive data/control messages from a client terminal using the second communication circuit 1008, which data/control messages were prepared for communication/transmission from the client terminal using the first wireless communication link 1010, but that were adapted for and communicated/transmitted instead using the second wireless communication link 1012. Since the data/control messages received by the second communication circuit 1008 were originally prepared (packetized) for transmission over the first wireless communication link 1010, the processing circuit 1004 may be adapted to (a) extract the packetized data/control messages from the message conveyed using the second communication circuit 1008 and (b) write the packetized data messages to the protocol stack buffer associated with the first communication circuit 1006 for additional processing.

The network communication circuit 1014 may be used to couple the proxy device 1002 to a serving network. For example, the proxy device 1002 may be a relay or femto cell that operates in a region to provide network connectivity to local client terminals. For instance, the proxy device 1002 may communicate wirelessly with the client terminal(s) over the first and/or second communication circuit but communicates over a landline broadband connection to the network, thereby facilitating transmissions between the client terminal(s) and the network.

By way of example and not limitation, in at least some embodiments, data/control messages may be conveyed from a client terminal via the first wireless communication link 1010 using a Random Access Channel (RACH) while operating in the quasi-active mode of RRC state Cell_FACH. Such data/control messages may be conveyed in packets to a protocol stack buffer associated with the first communication circuit 1006 where the packetized data messages are processed by the processing circuit 1004 to extract the data/control information from the various protocol stack layers of the RACH formatted packet. In some implementations, however, the same data/control messages may be packetized in preparation for transmission using the RACH, but may instead be conveyed to the processing circuit 1004 via the second wireless communication link, such as a Bluetooth communication link. In such cases, the packetized data/control messages received by the second communication circuit 1008 may be conveyed by the processing circuit 1004 from the second communication circuit 1008 to the protocol stack buffer associated with the first communication circuit 1006 in order to properly extract the data/control information from the various protocol stack layers of the RACH formatted packet.

In order for the second communication circuit 1008 to write packetized data/control messages to a protocol stack buffer, the second communication circuit 1008 may have read and/or write access to one or more storage devices or media adapted to implement the protocol stack buffer associated with the first communication circuit 1006.

Figure 11:
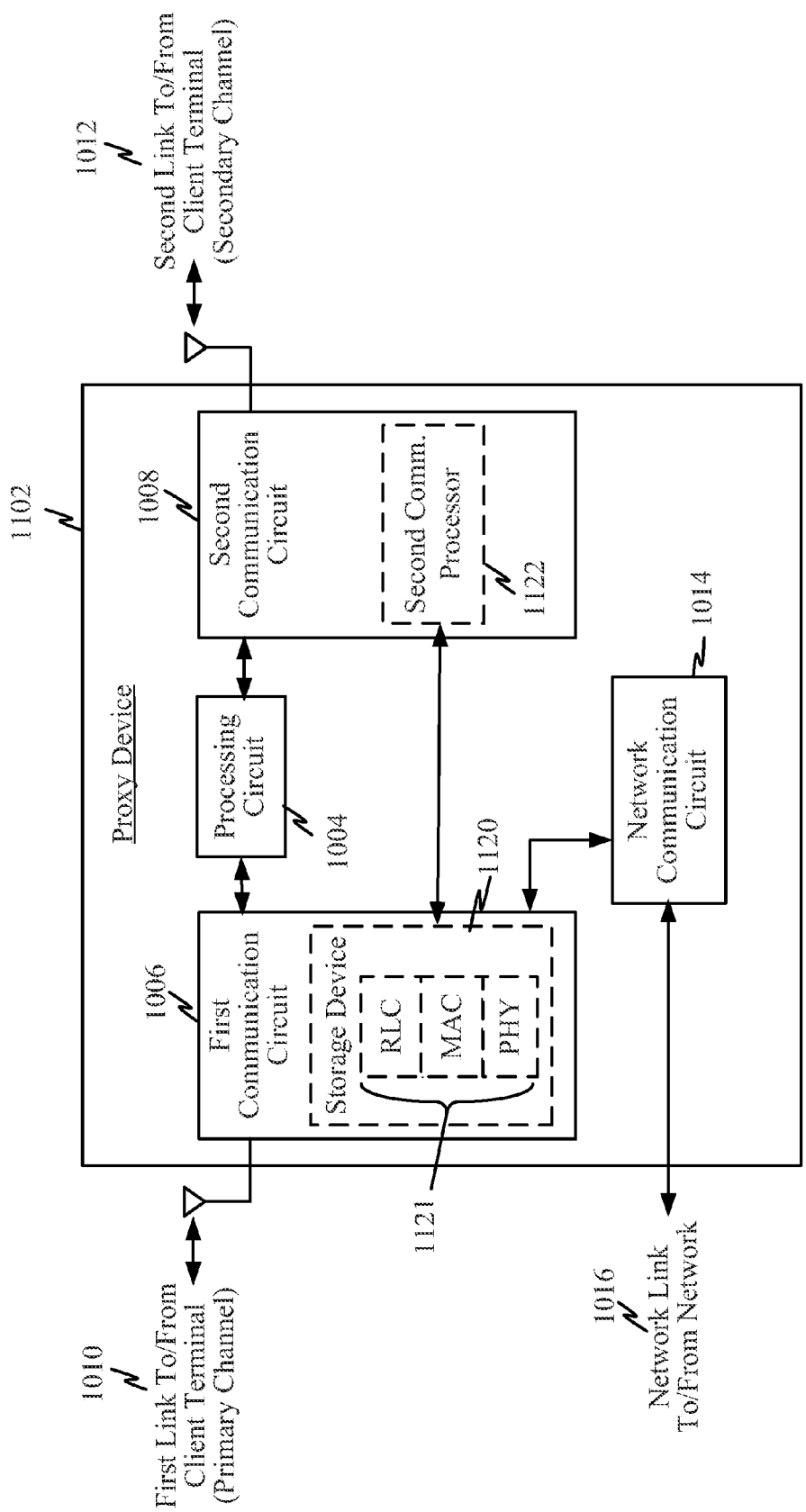
FIG. 11 illustrates a block diagram of select components of a client terminal according to at least one embodiment.

FIG. 11 illustrates a block diagram of select components of a proxy device 1102 according to at least one embodiment. As shown, the first communication circuit 1006 may include storage device 1120 adapted to implement a protocol stack buffer 1121 including a Radio Link Control (RLC) Layer buffer, a Medium Access Control (MAC) Layer buffer, and a Physical (PHY) Layer buffer. Note that the protocol stack may have additional higher layers (not shown). At least some of the protocol stack buffers, such as the MAC Layer buffer and the PHY Layer buffer, may be associated with the first communication circuit 1006. In other words, the MAC Layer buffer and the PHY Layer buffer may be configured to store data/control information that is processed for communication using the first communication circuit 1006. The second communication circuit 1008 may include a second communication processor 1122 coupled to the storage device 1120 for reading or writing packetized data/control messages from the second communication circuit 1008 to one or more buffers of the storage device 1122.

Figure 12:
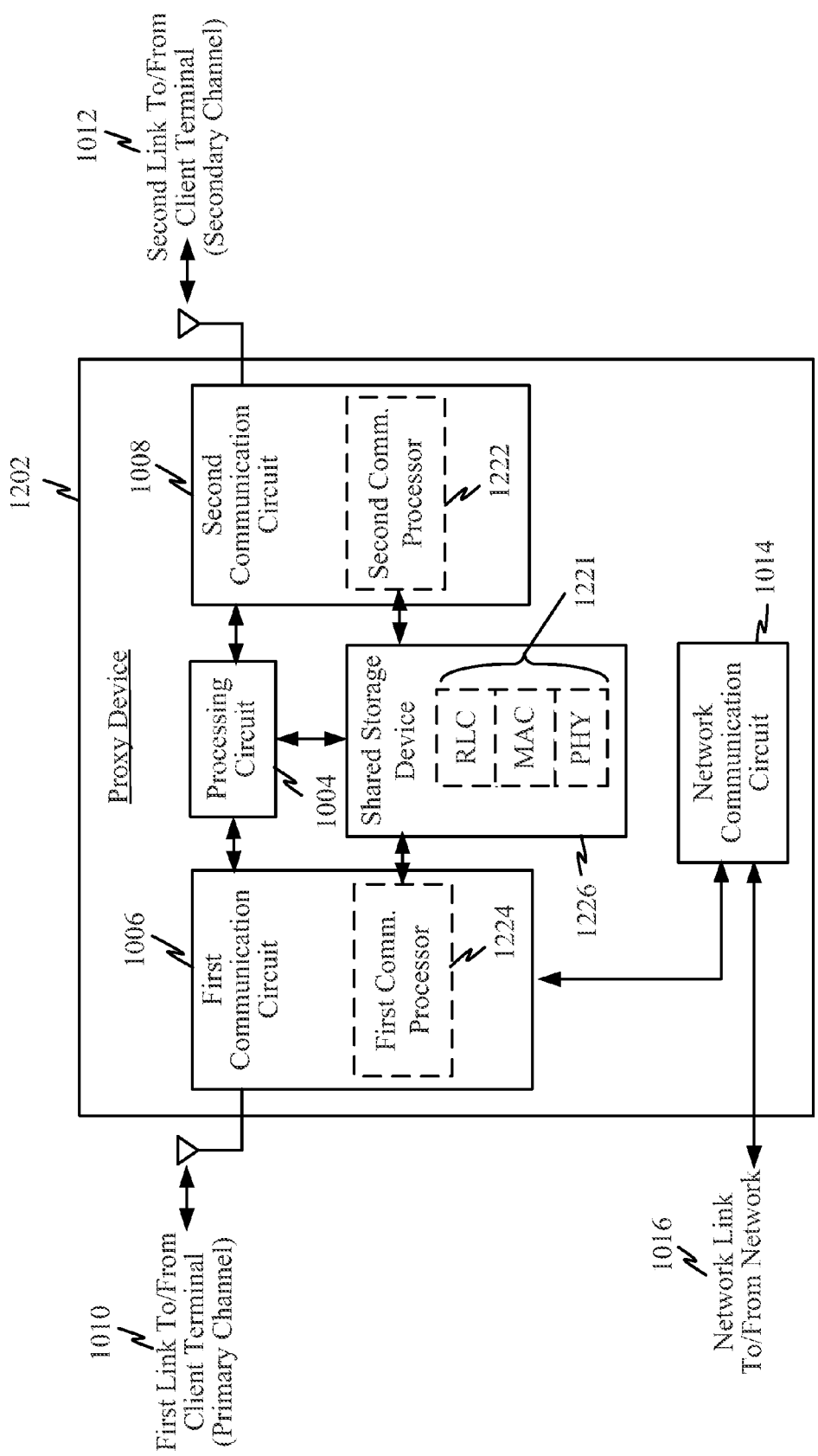
FIG. 12 illustrates a block diagram of select components of a client terminal according to another embodiment including a shared storage device coupled to a first communication processor of the first communication circuit and to a second communication processor of the second communication circuit.

FIG. 12 illustrates a block diagram of select components of a proxy device 1202 according to another embodiment including a shared storage device 1226 coupled to a first communication processor 1224 of the first communication circuit 1006 and to a second communication processor 1222 of the second communication circuit 1008. Accordingly, data/control messages received by either the first communication circuit 1006 or the second communication circuit 1008 may be written to protocol stack buffers 1221 implemented on the shared storage device 1226.

It should be noted that although FIGS. 11 and 12 show proxy devices terminals 1102 and 1202 comprising multiple processing circuitry (e.g., processing circuit 1004, first communication processor 1224 and second communication processor 1122/1222), the multiple processing circuits may be implemented as a single processing circuit according to various embodiments.

In accordance with additional features, at least some embodiments of the proxy device 1002 may be further adapted to operate as a proxy for one or more client terminals to monitor network connections (e.g., an internet connection), network characteristics (e.g., channel measurements) or a combination thereof for one or more client terminals identified on a client proxy list. That is, the proxy device 1002 may have agreed to act as a proxy for one or more client terminals. In such proxy mode, the processing circuit 1004 of the proxy device 1002 may monitor the network connection(s) associated with the client terminals for which it agreed to act as a proxy. If a data message is received from a network connection are needed, the processing circuit 1004 may forward/communicate the data and/or control information through the second communication circuit 1008 via a second wireless communication link 1012 to the corresponding client terminal.

For example, the processing circuit 1004 may be adapted (e.g., programmed) to receive a request from a client terminal to monitor a network connection for an application running on the client terminal. By way of example and not limitation, the client terminal may be running an application needing an active connection to the communication network, which may require a keep-alive signal (or a heartbeat) to be communicated to the network to verify that the connection should remain active. The processing circuit 1004 may receive a request to monitor the network connection, including a request to transmit any necessary heartbeats in order to keep the connection active. The processing circuit 1004 may then transmit a connection request to the network for the particular application and then transmit any necessary heartbeats for keeping the connection active. Upon receipt of a page indicator identifying, for example, that a data/control message is prepared to be transmitted to the client terminal, the processing circuit 1004 may forward the page indicator to the appropriate client terminal using its second communication circuit 1008.

In an alternative implementation, a femtocell (or femto cell) may be provided with the functionality of a proxy device. A femtocell is a small cellular base station, typically designed for use in a home or small business. The femtocell provides local client terminals (e.g., mobile devices, wireless mobile phones, etc.) communication connectivity to a service provider network. That is, the femtocell provides short range wireless connectivity to the client terminals and access to the service provider network via a broadband link (e.g., via a wire line or wireless internet or broadband connection). A femtocell allows service providers to extend service coverage indoors, especially where access would otherwise be limited or unavailable. In one example, the femtocell may include a first communication circuit that provides a communication link to the service provider's network and a second communication circuit that may implement one or more of the described functions of a proxy device. For instance, the second communication circuit may assist a client terminal in providing channel measurement feedback to the service provider network and/or assist in active synchronization of the client terminal.

Figure 13A:
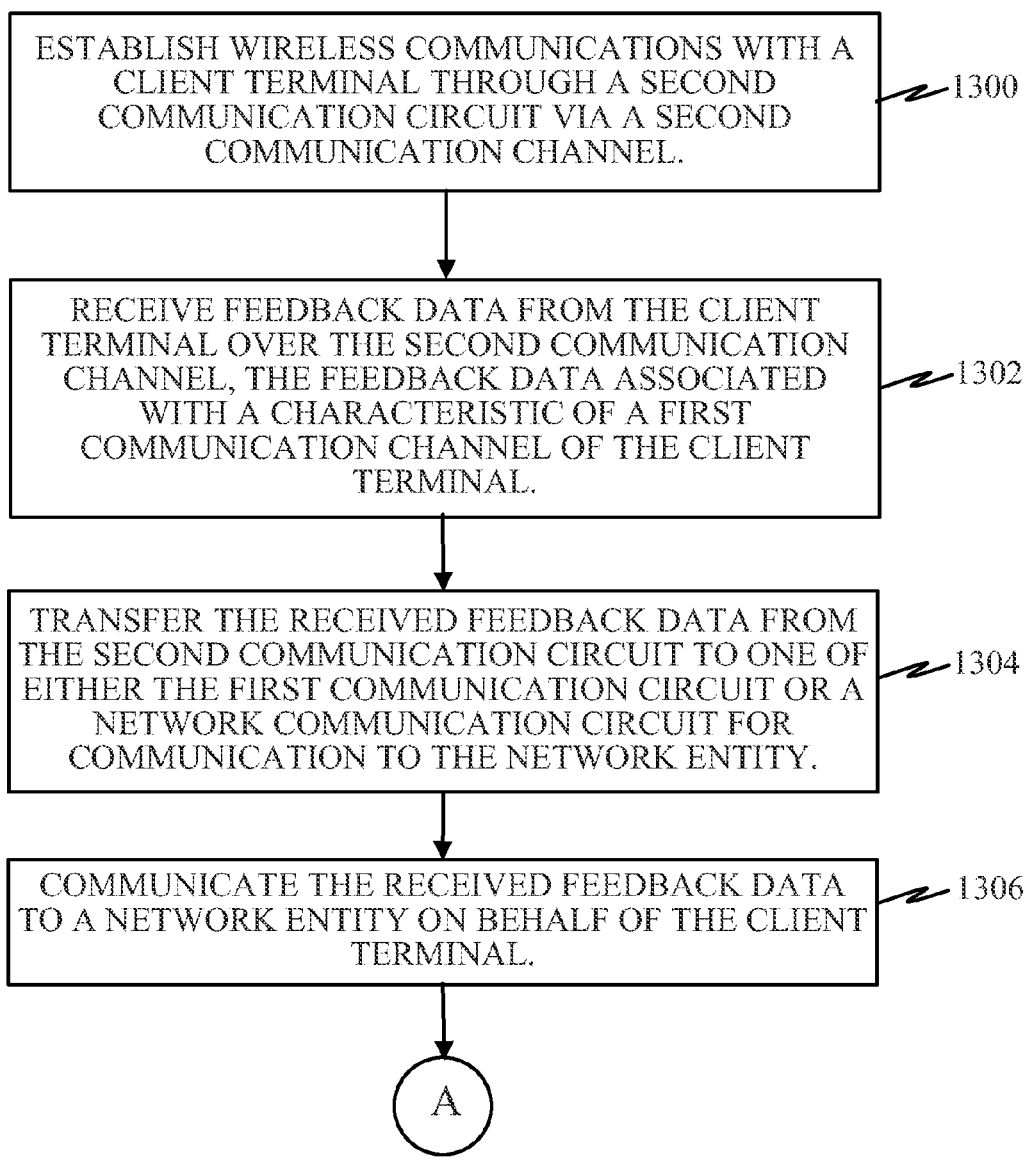
FIG. 13 (comprising FIGS. 13A and 13B) illustrates a flow diagram illustrating a method operational in a proxy device for facilitating communication with one or more client terminals using a first and/or a second wireless communication link/channel.
Figure 13B:
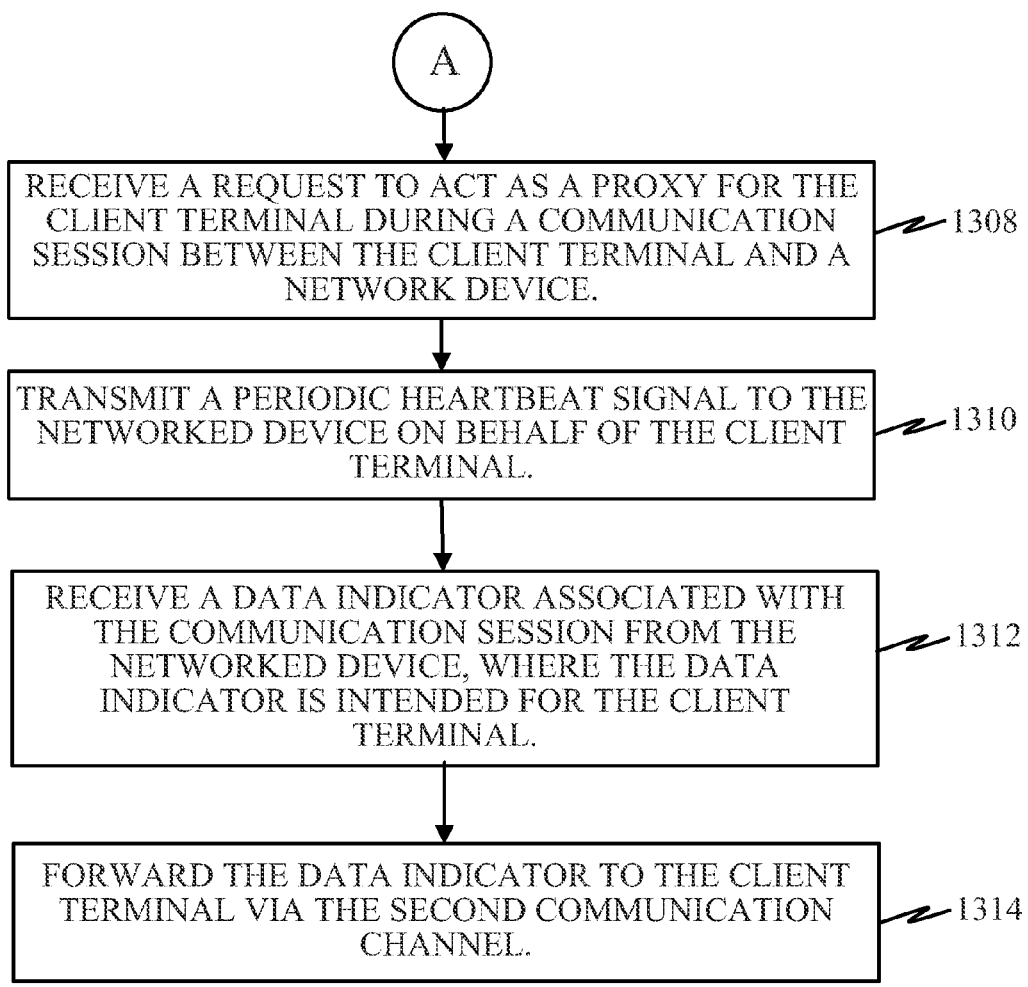

FIG. 13 (comprising FIGS. 13A and 13B) illustrates a flow diagram illustrating a method operational in a proxy device for facilitating communication with one or more client terminals using a first and/or a second wireless communication link/channel. As illustrated herein, the proxy device may be adapted to assist the client terminal in performing (a) channel measurement feedback using out-of-band signaling via the proxy device and/or (b) active synchronization with assistance of the proxy device. Note that the methods illustrated in FIGS. 13A and 13B may be performed together or independently (separate) from each other.

In assisting the client terminal to provide channel measurement feedback, the proxy device may establish wireless communications with a client terminal through a second communication circuit via a second communication channel 1300. The proxy device may the receive feedback data (and/or control information) from the client terminal over the second communication channel, the feedback data (and/or control information) associated with a characteristic of a first communication channel of the client terminal 1302. For instance, the feedback data (and/or control information) may be representative of one or more characteristics of the first communication channel as perceived by the client terminal. The first communication channel may operate within a wide area network and the second communication circuit is a Bluetooth compliant circuit. The communication channel for the client terminal may be a frequency spectrum used by the client terminal to communicate with the network entity. The proxy device may then transfer the received feedback data (and/or control information) from the second communication circuit to one of either the first communication circuit or a network communication circuit for communication to the network entity via the first communication circuit 1304. The second communication circuit may be adapted for short range transmissions relative to longer range transmissions by the first communication circuit. The proxy device may then communicate the received feedback data (and/or control information) to a network entity on behalf of the client terminal 1306. The proxy device may include a protocol stack buffer into which the feedback data (and/or control information) is placed for transmission to the network.

In assisting the client terminal to perform active synchronization, the proxy device may receive a request to act as a proxy for the client terminal during a communication session between the client terminal and a network device 1308. Consequently, the proxy device may transmit a periodic heartbeat signal to the networked device (e.g., via the first communication circuit or the networked communication circuit) on behalf of the client terminal 1310. Subsequently, the proxy device may receive a data indicator (e.g., via the first communication circuit or network communication circuit) associated with the communication session from the networked device, where the data indicator is intended for the client terminal 1312. The proxy device may then transmit the data indicator to the client terminal via the second communication channel 1314.

One or more of the components, steps, features and/or functions illustrated in the FIGS. may be rearranged and/or combined into a single component, step, feature or function or embodied in several components, steps, or functions. Additional elements, components, steps, and/or functions may also be added without departing from the invention. The apparatus, devices, and/or components illustrated in the FIGS. may be configured to perform one or more of the methods, features, or steps described in the FIGS. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A client terminal, comprising:
a first communication circuit for wirelessly communicating over a first communication channel;
a second communication circuit for wirelessly communicating over a second communication channel; and
a processing circuit coupled to the first communication circuit and the second communication circuit, the processing circuit adapted to:
establish communications with a proxy device over the first communication channel and the second communication channel, and
operate the first communication circuit in a power conserving mode where feedback data associated with the first communication channel bypasses the first communication circuit and is conveyed via the second communication channel,
wherein the first communication circuit conveys the feedback data with higher latency than when the second communication circuit conveys the feedback data.

2. The client terminal of claim 1, wherein transmissions via the second communication circuit take less power than equivalent transmissions via the first communication circuit.

3. The client terminal of claim 1, wherein in the power conserving mode the processing circuit maintains at least part of a protocol stack for the first communication circuit according to a quasi-connected mode while lower layers of the protocol stack of the first communication circuit operate according to a lowered power mode.

4. The client terminal of claim 1, wherein the first communication channel operates within a wide area network.

5. The client terminal of claim 1, wherein the second communication circuit is adapted for short range transmissions relative to longer range transmissions by the first communication circuit.

6. The client terminal of claim 1, wherein the first communication circuit and the processing circuit are further adapted to:
monitor the first communication channel to ascertain one or more channel conditions; and
generate the feedback data based on the ascertained one or more channel conditions.

7. The client terminal of claim 1, wherein the processing circuit is adapted to:
extract the feedback data from a buffer for the first communication circuit; and
transmit the feedback data via the second communication circuit.

8. The client terminal of claim 1, wherein the first communication circuit operates according to a Universal Mobile Telecommunications System (UMTS) Wideband Code Division Multiple Access (W-CDMA) air interface standard that specifies a plurality of Radio Resource Control (RRC) modes of operation.

9. The client terminal of claim 8, wherein the power conserving mode the first communication circuit transitions from a Cell Forward Access Channel (Cell_FACH) mode to an idle mode.

10. The client terminal of claim 1, wherein the feedback data is representative of one or more characteristics of the first communication channel as perceived by the client terminal.

11. The client terminal of claim 1, wherein the processing circuit is further adapted to:
establish a communication session with a networked device via the first communication circuit, wherein periodic heartbeat signals are to be sent by the client terminal to keep the communication session alive;
send a proxy request for a proxy device to send the periodic heartbeat signals on behalf of the client terminal and monitor the communication session for a data indicator; and
switch to a lowered power mode where the first communication circuit is idled or disabled while the second communication channel is monitored for a forwarded data indicator.

12. The client terminal of claim 11, wherein the second communication circuit and processing circuit are further adapted to:
receive the forwarded data indicator via the second communication channel; and
switch to a connected mode upon receipt of the forwarded data indicator in order to receive data as part of the communication session via the first communication channel.

13. A method operational in a client terminal, comprising:
establishing wireless communications with a proxy device through a first communication circuit via a first communication channel;
establishing wireless communications with a proxy device through a second communication circuit via a second communication channel; and
operating the first communication circuit in a power conserving mode where feedback data associated with the first communication channel bypasses the first communication circuit and is conveyed via the second communication channel,
wherein the first communication circuit conveys the feedback data with higher latency than when the second communication circuit conveys the feedback data.

14. The method of claim 13, wherein transmissions via the second communication circuit take less power than equivalent transmissions via the first communication circuit.

15. The method of claim 13, wherein the first communication channel operates within a wide area network, and the second communication circuit is adapted for short range transmissions relative to longer range transmissions by the first communication circuit.

16. The method of claim 13, wherein the feedback data is representative of one or more characteristics of the first communication channel as perceived by the client terminal.

17. The method of claim 13, wherein in the power conserving mode the processing circuit maintains at least part of a protocol stack for the first communication circuit according to a quasi-connected mode while lower layers of the protocol stack of the first communication circuit operate according to a lowered power mode.

18. The method of claim 13, further comprising:
monitoring the first communication channel to ascertain one or more channel conditions; and
generating the feedback data based on the ascertained one or more channel conditions.

19. The method of claim 13, further comprising:
extracting the feedback data from a buffer for the first communication circuit; and
transmitting the feedback data via the second communication circuit.

20. The method of claim 13, further comprising:
establishing a communication session with a networked device via the first communication circuit, wherein periodic heartbeat signals are to be sent by the client terminal to keep the communication session alive;
sending a proxy request for a proxy device to send the periodic heartbeat signals on behalf of the client terminal and monitor the communication session for a data indicator; and
switching to a lowered power mode where the first communication circuit is idled or disabled while the second communication channel is monitored for a forwarded data indicator.

21. The method of claim 20, further comprising:
receiving the forwarded data indicator via the second communication channel; and
switching the first communication circuit to a connected mode upon receipt of the forwarded data indicator in order to receive data as part of the communication session via the first communication channel.

22. A client terminal, comprising:
means for establishing wireless communications with a proxy device through a first communication circuit via a first communication channel;
means for establishing wireless communications with a proxy device through a second communication circuit via a second communication channel; and
means for operating the first communication circuit in a power conserving mode where feedback data associated with the first communication channel bypasses the first communication circuit and is conveyed via the second communication channel,
wherein the first communication circuit conveys the feedback data with higher latency than when the second communication circuit conveys the feedback data.

23. The client terminal of claim 22, further comprising:
means for monitoring the first communication channel to ascertain one or more channel conditions; and
means for generating the feedback data based on the ascertained one or more channel conditions.

24. The client terminal of claim 22, further comprising:
means for extracting the feedback data from a buffer for the first communication circuit; and
means for transmitting the feedback data via the second communication circuit.

25. The client terminal of claim 22, further comprising:
means for establishing a communication session with a networked device via the first communication circuit, wherein periodic heartbeat signals are to be sent by the client terminal to keep the communication session alive;
means for sending a proxy request for a proxy device to send the periodic heartbeat signals on behalf of the client terminal and monitor the communication session for a data indicator; and
means for switching to a lowered power mode where the first communication circuit is idled or disabled while the second communication channel is monitored for a forwarded data indicator from the proxy device.

26. A non-transitory processor-readable medium comprising one or more instructions operational on a client terminal, which when executed by a processor cause the processor to:
establish wirelessly communications with a proxy device through a first communication circuit via a first communication channel;
establish wirelessly communications with a proxy device through a second communication circuit via a second communication channel; and
operate the first communication circuit in a power conserving mode where the feedback data bypasses the first communication circuit and is conveyed to the proxy device via the second communication channel,
wherein the first communication circuit conveys the feedback data with higher latency than when the second communication circuit conveys the feedback data.

27. The non-transitory processor-readable medium of claim 26, further comprising one or more instructions which cause the processor to:
establish a communication session with a networked device via the first communication circuit, wherein periodic heartbeat signals are to be sent by the client terminal to keep the communication session alive;
send a proxy request for a proxy device to send the periodic heartbeat signals on behalf of the client terminal and monitor the communication session for a data indicator; and
switch to a lowered power mode where the first communication circuit is idled or disabled while the second communication channel is monitored for a forwarded data indicator from the proxy device.

28. A proxy device, comprising:
a first communication circuit for wirelessly communicating over a first communication channel;
a second communication circuit for wirelessly communicating over a second communication channel; and
a processing circuit coupled to the first communication circuit and the second communication circuit, the processing circuit adapted to:
receive feedback data from a client terminal over the second communication channel, the feedback data associated with a characteristic of a first communication channel for the client terminal, and
communicate the received feedback data to a network entity on behalf of the client terminal,
wherein the first communication circuit receives the feedback data with higher latency than when the second communication circuit receives the feedback data.

29. The proxy device of claim 28, further comprising:
a network communication circuit for coupling the proxy device to the network entity, wherein the processing circuit is further adapted to transfer the received feedback data from the second communication circuit to one of either the first communication circuit or the network communication circuit for transmission to the network entity.

30. The proxy device of claim 28, wherein the first communication channel operates within a wide area network and the second communication circuit is a Bluetooth compliant circuit.

31. The proxy device of claim 28, wherein the second communication circuit is adapted for short range transmissions relative to longer range transmissions by the first communication circuit.

32. The proxy device of claim 28, further comprising:
a storage device coupled to the processing circuit and adapted to implement a protocol stack buffer into which the feedback data is placed for transmission to the network entity.

33. The proxy device of claim 28, wherein the feedback data associated with a characteristic of a communication channel for the client terminal includes feedback data associated with a frequency spectrum used by the client terminal to communicate with the network entity.

34. The proxy device of claim 28, wherein the processing circuit is adapted to:
receive a request via the second communication channel to act as a proxy for the client terminal during a communication session between the client terminal and a networked device; and
transmit one or more periodic heartbeat signals to the networked device on behalf of the client terminal to keep the communication session alive via a network communication channel with the network entity.

35. The proxy device of claim 34, wherein the processing circuit is further adapted to:
receive a data indicator associated with the communication session from the networked device via the network communication channel, where the data indicator is intended for the client terminal; and
forward the data indicator to the client terminal via the second communication channel.

36. A method operational in a proxy device, comprising:
receiving feedback data from a client terminal over a second communication channel with a second communication circuit, the feedback data associated with a characteristic of a first communication channel associated with a first communication circuit for the client terminal; and
communicating the received feedback data to a network entity on behalf of the client terminal,
wherein the first communication circuit receives the feedback data with higher latency than when the second communication circuit receives the feedback data.

37. The method of claim 36, further comprising:
transferring the received feedback data from the second communication circuit to one of either the first communication circuit or a network communication circuit in communication with the network entity for communicating the received feedback data to the network entity.

38. The method of claim 36, wherein the second communication circuit is adapted for short range transmissions relative to longer range transmissions by the first communication circuit.

39. The method of claim 36, wherein the feedback data is representative of one or more characteristics of the first communication channel as perceived by the client terminal.

40. The method of claim 36, further comprising:
receiving a request via the second communication channel to act as a proxy for the client terminal during a communication session between the client terminal and a networked device; and
transmitting one or more periodic heartbeat signals to the networked device on behalf of the client terminal to keep the communication session alive via a network communication channel with the network entity.

41. The method of claim 40, further comprising:
receiving a data indicator associated with the communication session from the networked device via the network communication channel, where the data indicator is intended for the client terminal; and
forwarding the data indicator to the client terminal via the second communication channel.

42. A proxy device, comprising:
second means for receiving feedback data from a client terminal over a second communication channel, the feedback data associated with a characteristic of a first communication channel associated with first means for the client terminal; and
means for communicating the received feedback data to a network entity on behalf of the client terminal,
wherein the first means receives the feedback data with higher latency than when the second means receives the feedback data.

43. The proxy device of claim 42, wherein the second means for receiving the feedback data from the client terminal over the second communication channel includes a second communication circuit adapted for short range transmissions relative to longer range transmissions by a first communication circuit of the proxy device.

44. The proxy device of claim 42, further comprising:
means for receiving a data indicator associated with a communication session from the networked entity via a network communication channel, where the data indicator is intended for the client terminal; and
means for forwarding the data indicator to the client terminal via the second communication channel.

45. A non-transitory processor-readable medium comprising one or more instructions operational on a proxy device, which when executed by a processor causes the processor to:
receive feedback data from a client terminal over a second communication channel with a second communication circuit, the feedback data associated with a characteristic of a first communication channel associated with a first communication circuit for the client terminal; and communicate the received feedback data to a network entity on behalf of the client terminal, wherein the first communication circuit receives the feedback data with higher latency than when the second communication circuit receives the feedback data.

46. The non-transitory processor-readable medium of claim 45, further comprising one or more instructions, which when executed by the processor causes the processor to:

transfer the received feedback data from the second communication circuit to one of either the first communication circuit or a network communication circuit for communication to the network entity.

47. The non-transitory processor-readable medium of claim 45, further comprising one or more instructions, which when executed by the processor causes the processor to:

receive a request via the second communication channel to act as a proxy for the client terminal during a communication session between the client terminal and a networked device; and transmit one or more periodic heartbeat signals to the networked device on behalf of the client terminal to keep the communication session alive via a network communication channel with the network entity.

48. The non-transitory processor-readable medium of claim 47, further comprising one or more instructions, which when executed by the processor causes the processor to:

receive a data indicator associated with the communication session from the networked device via the network communication channel, where the data indicator is intended for the client terminal; and forward the data indicator to the client terminal via the second communication channel.

\* \* \* \* \*